United States Patent
Nishino

(10) Patent No.: US 7,602,935 B2
(45) Date of Patent: Oct. 13, 2009

(54) DATA PROCESSING APPARATUS AND ASSOCIATED METHOD OF IDENTIFYING AN IMAGE DATA SOURCE BY DETECTING VARIATIONS IN STRENGTH OF DIFFERENT LIGHT RECEIVING ELEMENTS

(75) Inventor: Yoichi Nishino, Tokyo (JP)

(73) Assignee: Sony Corporation, Tokyo (JP)

( * ) Notice: Subject to any disclaimer, the term of this patent is extended or adjusted under 35 U.S.C. 154(b) by 585 days.

(21) Appl. No.: 10/678,747

(22) Filed: Oct. 6, 2003

(65) Prior Publication Data

US 2004/0120545 A1 Jun. 24, 2004

(30) Foreign Application Priority Data

| Oct. 4, 2002 | (JP) | .............................. 2002-292621 |
| Apr. 7, 2003 | (JP) | .............................. 2003-103115 |

(51) Int. Cl.
*G06K 9/00* (2006.01)

(52) U.S. Cl. ........................ 382/100; 382/190; 382/206; 382/209

(58) Field of Classification Search ................. 382/278, 382/100, 190, 209, 206; 348/247
See application file for complete search history.

(56) References Cited

U.S. PATENT DOCUMENTS

| 4,652,339 | A | * | 3/1987 | Bluzer et al. ................. 438/587 |
| 5,726,915 | A | * | 3/1998 | Prager et al. ................. 702/116 |
| 5,764,770 | A | * | 6/1998 | Schipper et al. ............. 713/176 |
| 6,076,004 | A | * | 6/2000 | Kanayama et al. .......... 600/410 |
| 6,285,775 | B1 | * | 9/2001 | Wu et al. ..................... 382/100 |
| 6,477,431 | B1 | * | 11/2002 | Kalker et al. ................ 700/39 |
| 6,628,845 | B1 | * | 9/2003 | Stone et al. .................. 382/294 |
| 6,661,456 | B1 | * | 12/2003 | Aufrichtig et al. ........... 348/247 |
| 7,031,493 | B2 | * | 4/2006 | Fletcher et al. ............. 382/100 |
| 7,129,973 | B2 | * | 10/2006 | Raynor ..................... 348/231.3 |

OTHER PUBLICATIONS

Digital camera identification from sensor pattern noise Lukas, J.; Fridrich, J.; Goljan, M.; Information Forensics and Security, IEEE Transactions on vol. 1, Issue 2, Jun. 2006 pp. 205-214.*
Qin-Sheng Chen, et al., "Symmetric Phase-Only Matched Filtering of Fourier-Mellin Transforms for Image Registration and Recognition", IEEE Transactions on Pattern Analysis and Machine Intelligence, vol. 16, No. 12, XP-000486818, Dec. 1994, pp. 1156-1168.
Kenji Kurosawa, et al., "CCD Fingerprint Method-Identification of a Video Camera from Videotaped Images", IEEE, XP-10368884, 1999, pp. 537-540.
Zeno J. Geradts, et al., "Methods for identification of images acquired with Digital cameras", Proceedings of SPIE, vol. 4232, XP-008054356, 2001, pp. 505-512.

* cited by examiner

*Primary Examiner*—Bhavesh M Mehta
*Assistant Examiner*—Sean Motsinger
(74) *Attorney, Agent, or Firm*—Oblon, Spivak, McClelland, Maier & Neustadt, L.L.P.

(57) ABSTRACT

A data processing apparatus and data processing method enabling a camera generating image data to be identified easily with a high reliability, which identify if a predetermined image generating apparatus having distinctive variations in light receiving intensity of individual light receiving elements and generating image data based on light receiving results of the plurality of light receiving elements generated the first image data to be identified, wherein a correlation detector detects correlation between first image data and second image data for reference generated using a predetermined image generating apparatus and a CPU identifies if the first image data was generated using an image generating apparatus based on that correlation.

13 Claims, 36 Drawing Sheets

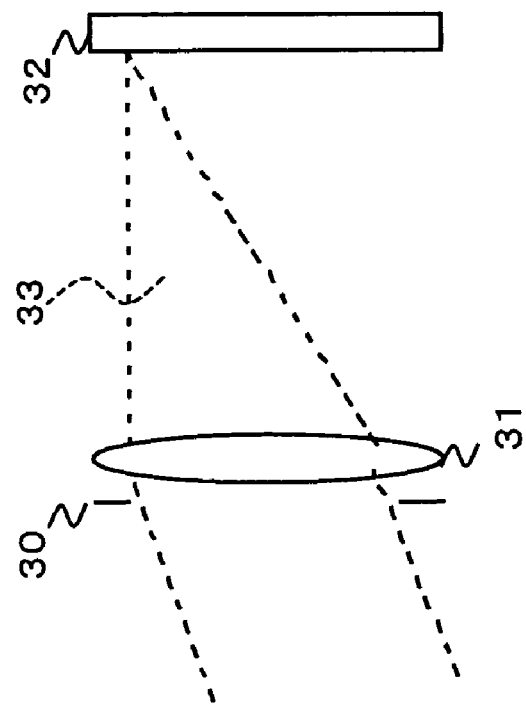
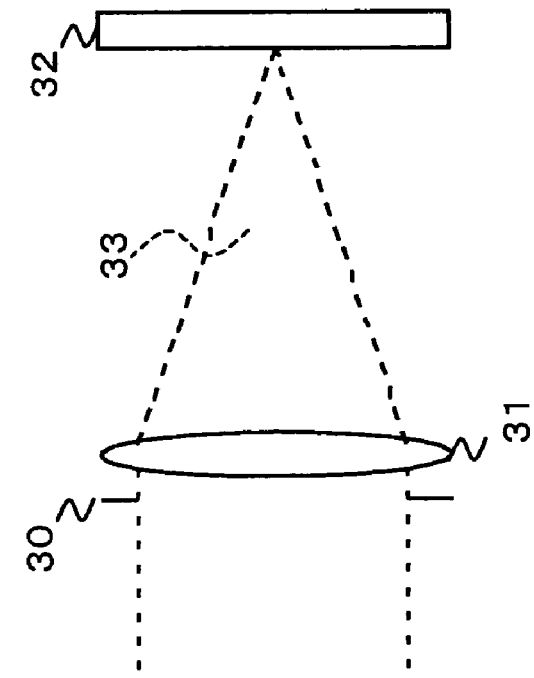
FIG. 8B
FIG. 8A

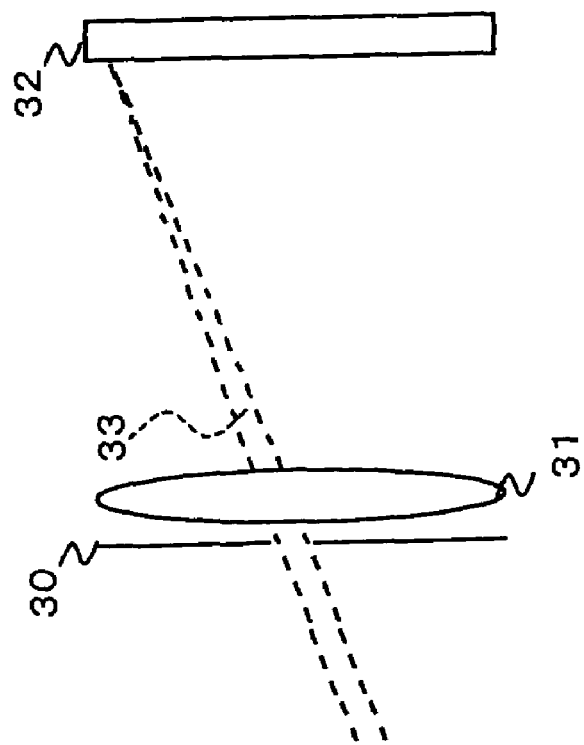
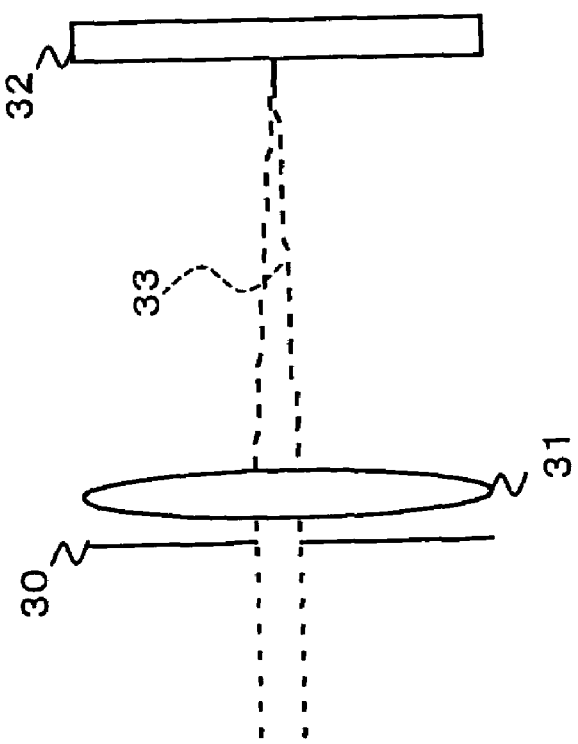
FIG. 9A
FIG. 9B

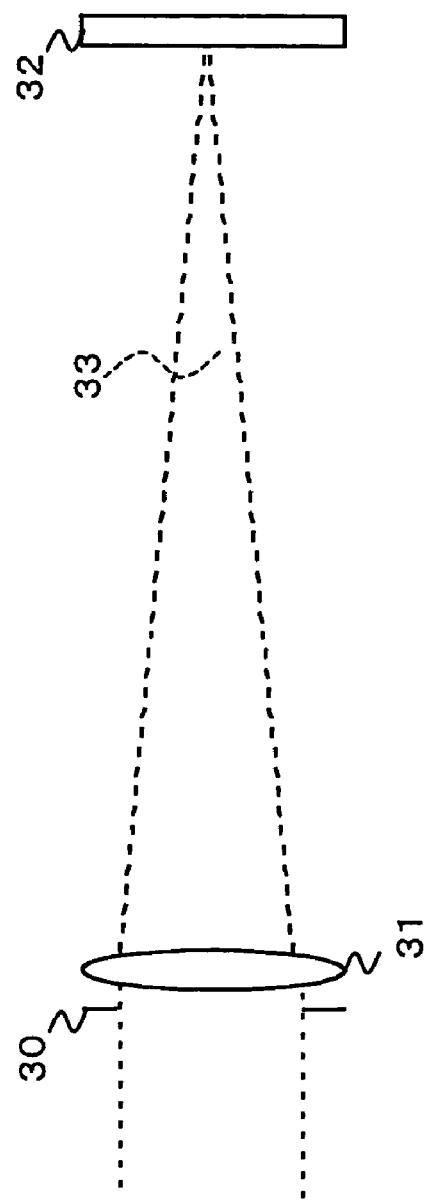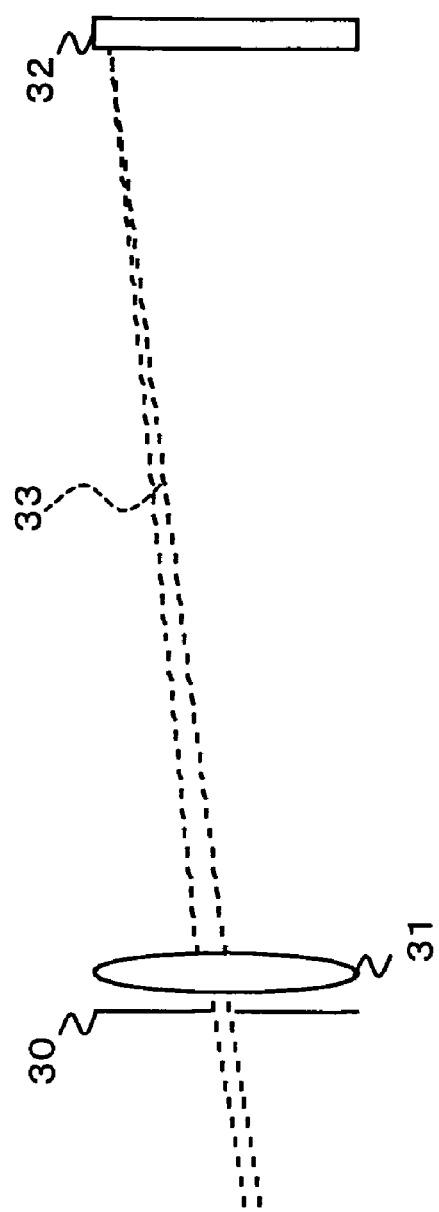
FIG. 10A
FIG. 10B

FIG. 15A

S60: HEADER | 1 | 2 | 3 | 4 | 5 | 6

FIG. 15B

S61: HEADER | 1 | 2 | 3A | 4 | 5 | 6

FIG. 28
BULLETIN BOARD
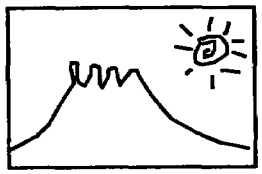
SUBMITTER: SMITH
COMMENT: MT. FUJI
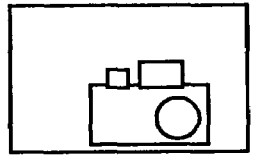
SUBMITTER: JONES
COMMENT: CAMERA
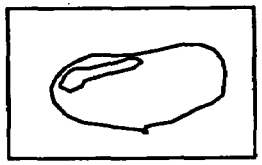
SUBMITTER: WHITE
COMMENT: BEAN
451

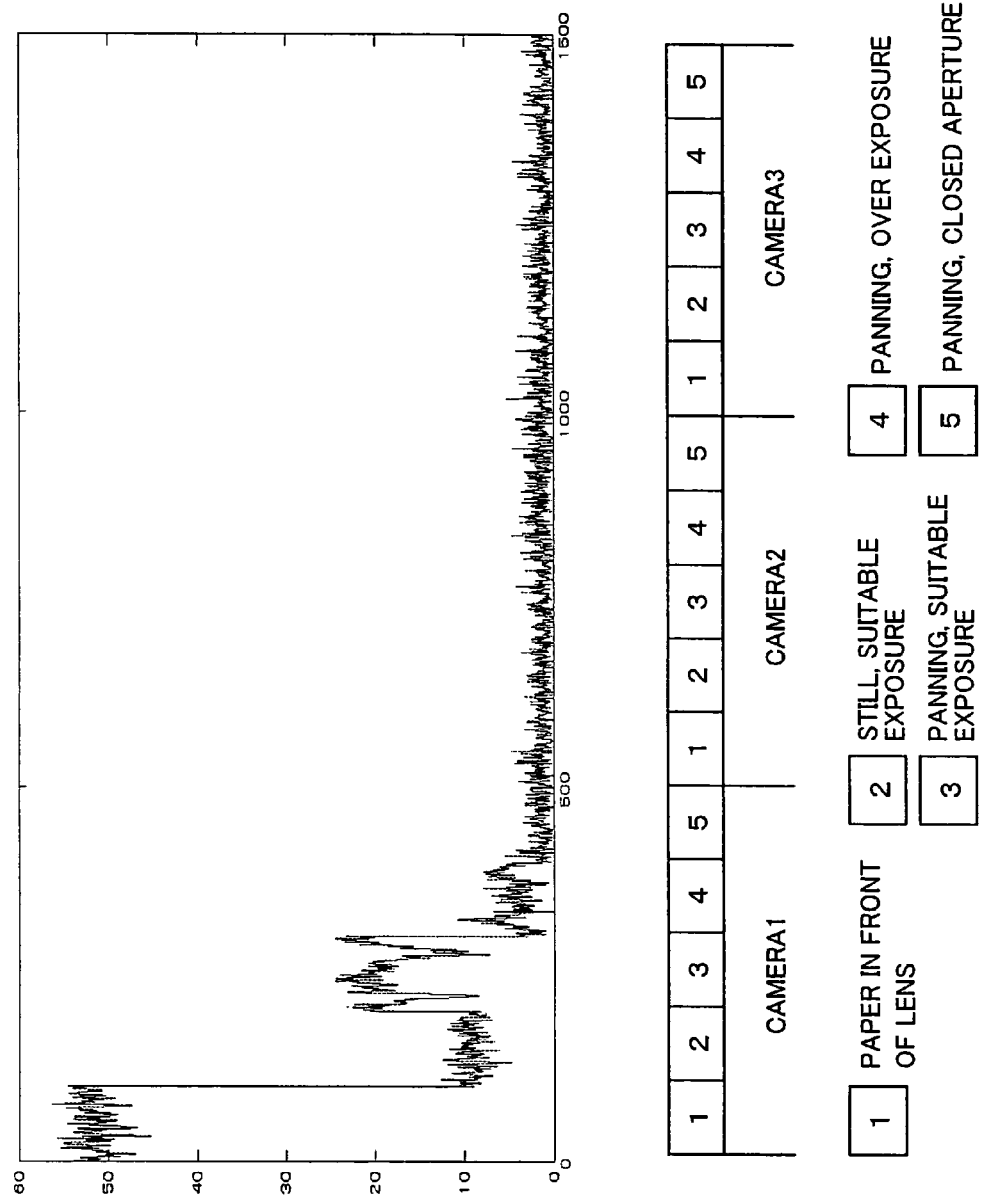

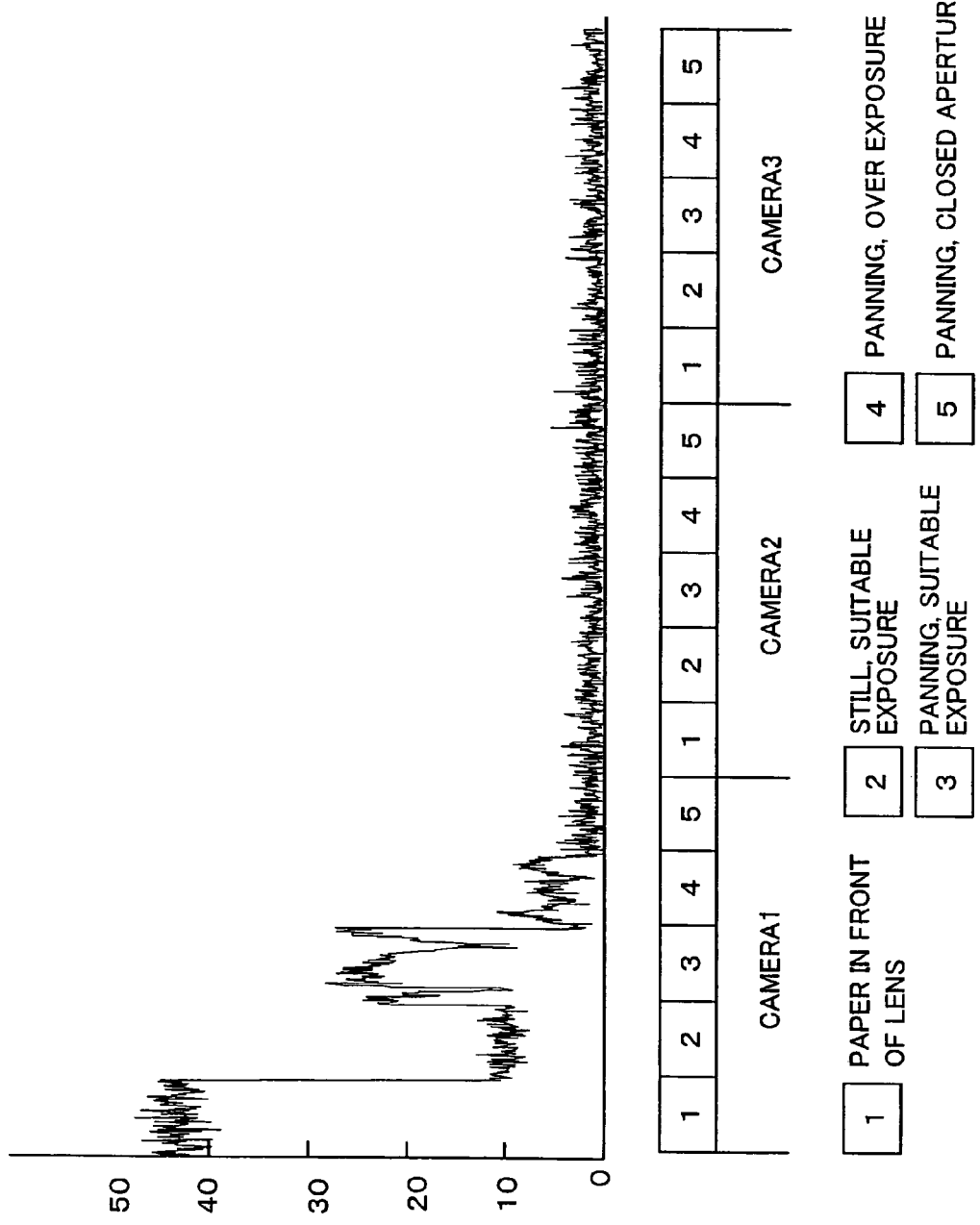

US 7,602,935 B2

DATA PROCESSING APPARATUS AND ASSOCIATED METHOD OF IDENTIFYING AN IMAGE DATA SOURCE BY DETECTING VARIATIONS IN STRENGTH OF DIFFERENT LIGHT RECEIVING ELEMENTS

BACKGROUND OF THE INVENTION

1. Field of the Invention

The present invention relates to a data processing apparatus and method for identifying a camera obtaining image data.

2. Description of the Related Art

Image data of a digital type obtained by a digital type camera for example is sometimes illegitimately used by a third party without receiving the authorization of the owner of the copyright of the image data.

To present such illegitimate usage, there is the method of imparting information specifying the camera producing that image data, electronic watermark information, or the header of the image file to the image data.

With the method of adding electronic watermark information to the image data, however, since the methods of embedding the electronic watermarks cannot be standardized, there is the problem that sometimes the electronic watermark information cannot be detected.

Further, with the method of adding the header of the image file, there is the problem that the information specifying the camera ends up being easily tampered with by rewriting the header.

SUMMARY OF THE INVENTION

An object of the present invention is to provide a data processing apparatus and method enabling the camera producing image data to be easily identified with a high reliability.

According to a first aspect of the present invention, there is provided a data processing apparatus for identifying whether image data was generated by a predetermined image generating apparatus generating image data based on light receiving results of light receiving elements having distinctive variations in light receiving sensitivity, comprising a correlation detecting means for detecting correlation between the first image data and second image data for reference generated using the predetermined image generating apparatus and an identifying means for identifying if the first image data was generated using the image generating apparatus based on the correlation detected by the correlation detecting means.

The operation of the data processing apparatus of the first aspect of the present invention is as follows.

The correlation detecting means detects correlation between the first image data and the second image data for reference generated using the predetermined image generating apparatus.

Further, the identifying means identifies if the first image data was generated using the image generating apparatus based on the correlation detected by the correlation detecting means.

In the data processing apparatus of the first aspect of the invention, preferably the correlation detecting means detects the correlation using the second image data displaying a pattern with no correlation with the pattern displayed based on the first image data.

In the data processing apparatus of the first aspect of the invention, preferably the correlation detecting means comprises a transforming means for orthogonal transformation of the first image data and the second image data to generate first frequency component data and second frequency component data, a dividing means for dividing each complex number data forming the first frequency component data by an absolute value of each complex number data to generate first complex number data and for dividing each complex number data forming the second frequency component data by an absolute value of each complex number data to generate second complex number data, a substituting means for substituting each complex number data forming one of the first complex number data and the second complex number data with complex conjugate complex number data to generate third complex number data, a multiplying means for multiplying the one of the first complex number data and second complex number data not substituted by the substituting means and the third complex number data generated by the substituting means to generate fourth complex number data, and an inverse transformation circuit for inverse orthogonal transformation of the fourth complex number data generated by the multiplying means to generate the correlation data.

According to a second aspect of the invention, there is provided a data processing method for identifying if image data was generated by a predetermined image generating apparatus generating image data based on light receiving results of light receiving elements having distinctive variations in light receiving sensitivity, comprising a first step of detecting correlation between the first image data and second image data for reference generated using the predetermined image generating apparatus and a second step of identifying if the first image data was generated using the image generating apparatus based on the correlation detected at the first step.

According to a third aspect of the present invention, there is provided a data processing apparatus for identifying whether first image data to be identified was generated by any image generating apparatus among a plurality of image generating apparatuses generating image data based on light receiving results of light receiving elements having distinctive variations in light receiving sensitivity, comprising a holding means for holding a plurality of second image data for reference generated using the plurality of image generating apparatuses, a correlation detecting means for detecting correlation between the first image data and the second image data held by the holding means, and an identifying means for identifying if the first image data was generated using any of the plurality of image generating apparatuses based on the correlation detected by the correlation detecting means.

The operation of the data processing apparatus of the third aspect of the invention is as follows:

The correlation detecting means detects the correlation between the first image data and the second image data held by the holding means.

The identifying means identifies if the first image data was generated by one of the plurality of image generating apparatuses based on the correlation detected by the correlation detecting means.

According to a fourth aspect of the present invention, there is provided a data processing method performed by a data processing apparatus for identifying whether first image data to be identified was generated by any image generating apparatus among a plurality of image generating apparatuses generating image data based on light receiving results of light receiving elements having distinctive variations in light receiving sensitivity and holding a plurality of second image data for reference generated using the plurality of image generating apparatuses, comprising a first step of detecting correlation between the first image data and the held second image data and a second step of identifying if the first image data was generated using any of the plurality of image generating apparatuses based on the correlation detected at the first step.

According to a fifth aspect of the present invention, there is provided a data processing apparatus for identifying whether first image data to be identified was generated by an image generating apparatus generating image data based on light receiving results of light receiving elements having distinctive variations in light receiving sensitivity, comprising a holding means for holding a plurality of second image data for reference generated in advance using stolen image generating apparatuses, a correlation detecting means for detecting correlation between the first image data and the second image data held by the holding means, and an identifying means for identifying if the first image data was generated using a stolen image generating apparatus based on the correlation detected by the correlation detecting means.

The operation of the data processing apparatus of the fifth aspect of the invention is as follows.

The correlation detecting means detects correlation between the first image data and the second image data held by the holding means.

The identifying means identifies whether the first image data was generated using a stolen image generating apparatus based on the correlation detected by the correlation detecting means.

According to a sixth aspect of the present invention, there is provided a data processing method performed by a data processing apparatus for identifying whether first image data to be identified was generated by an image generating apparatus generating image data based on light receiving results of light receiving elements having distinctive variations in light receiving sensitivity and holding a plurality of second image data for reference generated in advance using stolen image generating apparatuses, comprising a first step of detecting correlation between the first image data and the held second image data and a second step of identifying if the first image data was generated using a stolen image generating apparatus based on the correlation detected at the first step.

According to a seventh aspect of the present invention, there is provided a data processing apparatus for identifying whether first image data to be identified was generated by an image generating apparatus generating image data based on light receiving results of light receiving elements having distinctive variations in light receiving sensitivity, comprising a holding means for holding authorized broadcaster data specifying a broadcaster authorized to broadcast image data generated using a predetermined image generating apparatus and second image data for reference generated using the predetermined image generating apparatus, a correlation detecting means for detecting correlation between the first image data broadcast by a predetermined broadcaster and the second image data held by the holding means, a first identifying means for identifying if the first image data was generated using an image generating apparatus based on the correlation detected by the correlation detecting means, and a second identifying means for identifying if the broadcaster broadcasting the first image data was authorized based on the authorized broadcaster data held by the holding means when the first identifying means identifies that the first image data was generated using the image generating apparatus.

The operation of the data processing apparatus of the seventh aspect of the invention is as follows.

The correlation detecting means detects the correlation between the first image data broadcast by a predetermined broadcaster and the second image data held by the holding means.

Further, the first identifying means identifies if the first image data was generated using the image generating apparatus based on the correlation detected by the correlation detecting means.

Further, the second identifying means identifies if the broadcaster broadcasting the first image data was authorized based on the authorized broadcaster data held by the holding means when the first identifying means identifies that the first image data was generated using the image generating apparatus.

According to an eighth aspect of the present invention, there is provided a data processing method performed by a data processing apparatus for identifying whether first image data to be identified was generated by an image generating apparatus generating image data based on light receiving results of light receiving elements having distinctive variations in light receiving sensitivity and holding authorized broadcaster data specifying a broadcaster authorized to broadcast image data generated using a predetermined image generating apparatus and second image data for reference generated using the predetermined image generating apparatus, comprising a first step of detecting correlation between the first image data broadcast by a predetermined broadcaster and the second image data held by the data processing apparatus, a second step of identifying if the first image data was generated using the image generating apparatus based on the correlation detected at the first step, and a third step of identifying if the broadcaster broadcasting the first image data was authorized based on the authorized broadcaster data held by the data processing apparatus when it was identified at the second step that the first image data was generated using the image generating apparatus.

According to a ninth aspect of the present invention, there is provided a data processing apparatus for searching for image data generated by a predetermined image generating apparatus generating image data based on light receiving results of light receiving elements having distinctive variations in light receiving sensitivity, comprising a correlation detecting means for detecting correlation between a plurality of first image data stored in a storing means and second image data for reference generated using the predetermined image generating apparatus and a searching means for searching for image data generated using the image generating apparatus in the plurality of first image data stored in the storing means based on the correlation detected by the correlation detecting means.

The operation of the data processing apparatus of the ninth aspect of the invention is as follows.

The correlation detecting means detects the correlation between a plurality of first image data stored in a storing means and second image data for reference generated using a predetermined image generating apparatus.

Further, the searching means searches for image data generated using the image generating apparatus in the plurality of first image data stored in the storing means based on the correlation detected by the correlation detecting means.

According to a 10th aspect of the present invention, there is provided a data processing method performed by a data processing apparatus for searching for image data generated by a predetermined image generating apparatus generating image data based on light receiving results of light receiving elements having distinctive variations in light receiving sensitivity, comprising a first step of detecting correlation between a plurality of first image data stored in a storing means and second image data for reference generated using the predetermined image generating apparatus and a second step of searching for image data generated using the image generating apparatus in the plurality of first image data stored in the storing means based on the correlation detected at the first step.

According to an 11th aspect of the present invention, there is provided a data processing apparatus for identifying if image data is generated by a predetermined image generating apparatus generating image data based on light receiving results of light receiving elements having distinctive variations in light receiving sensitivity, comprising a correlation detecting means for detecting correlation between first block image data and second block image data corresponding to the first block image data in a plurality of second block image data forming second image data generated by the image generating apparatus for each of a plurality of first block image data forming the first image data to be identified and an identifying means for identifying if the first image data was generated based on image data generated using the image generating apparatus based on the correlation detected by the correlation detecting means.

According to a 12th aspect of the present invention, there is provided a data processing method for identifying if image data was generated by a predetermined image generating apparatus generating image data based on light receiving results of light receiving elements having distinctive variations in light receiving sensitivity, comprising a first step of detecting correlation between first block image data and second block image data corresponding to the first block image data in a plurality of second block image data forming second image data generated by the image generating apparatus for each of a plurality of first block image data forming the first image data to be identified and a second step of identifying if the first image data was generated based on image data generated using the image generating apparatus based on the correlation detected at the first step.

According to a 13th aspect of the present invention, there is provided a data processing apparatus for identifying whether image data was generated by a predetermined image generating apparatus generating image data based on light receiving results of light receiving elements having distinctive variations in light receiving sensitivity, comprising a correlation detecting means for detecting correlation between first image data to be identified and second image data for reference generated using the image generating apparatus and an identifying means for identifying if the first image data was generated using the image generating apparatus based on the correlation detected by the correlation detecting means, the correlation detecting means comprises a transforming means for orthogonal transformation of the first image data and the second image data to generate first frequency component data and second frequency component data, a processing means for processing so that the first frequency component data is more strongly restricted in amplitude compared with the second frequency component data by generating first complex number data based on each of the complex number data forming the first frequency component data and generating second complex number data based on each of the complex number data forming the second frequency component data, a substituting means for substituting each complex number data forming one of the first complex number data and the second complex number data generated by the processing means with complex conjugate complex number data to generate third complex number data, a multiplying means for multiplying the one of the first complex number data and second complex number data not substituted by the substituting means and the third complex number data generated by the substituting means to generate fourth complex number data, and an inverse transformation circuit for inverse orthogonal transformation of the fourth complex number data generated by the multiplying means to generate correlation data showing the correlation.

According to a 14th aspect of the present invention, there is provided a data processing apparatus for registering as image data for provision the image data generated by a predetermined image generating apparatus generating image data based on light receiving results of light receiving elements having distinctive variations in light receiving sensitivity, comprising an interface for inputting a registration request including first image data to be identified and user identification data, a storing means for storing the user identification data and second image data for reference linked together, a correlation detecting means for reading out the second image data from the storing means based on the user identification data included in the registration request input through the interface and detecting correlation between the read second image data and the first image data included in the registration request, and an identifying means for identifying if the first image data was registered as image data for provision based on the correlation detected by the correlation detecting means.

As explained above, according to the present invention, it is possible to provide a data processing apparatus and method enabling an image generating apparatus generating image data to be identified easily with a high reliability.

BRIEF DESCRIPTION OF THE DRAWINGS

These and other objects and features of the present invention will become clearer from the following description of the preferred embodiments given with reference to the attached drawings, wherein:

FIGS. 8A and 8B are views for explaining a third technique for improving the precision of identification of the data processing apparatus shown in FIG. 1;

FIGS. 9A and 9B are views for explaining a third technique for improving the precision of identification of the data processing apparatus shown in FIG. 1;

FIGS. 10A and 10B are views for explaining a third technique for improving the precision of identification of the data processing apparatus shown in FIG. 1;

FIGS. 15A and 15B are views for explaining a fourth example of application of the data processing apparatus shown in FIG. 1;

FIG. 28 is a view for explaining a ninth example of a business application of the data processing apparatus shown in FIG. 1;

FIG. 35 is a view for explaining a modification of the correlation detector shown in FIG. 3;

FIG. 36 is a view for explaining a modification of the correlation detector shown in FIG. 3.

DESCRIPTION OF THE PREFERRED EMBODIMENTS

Next, a data processing apparatus 1 according to an embodiment of the present invention will be explained.

Figure 1:
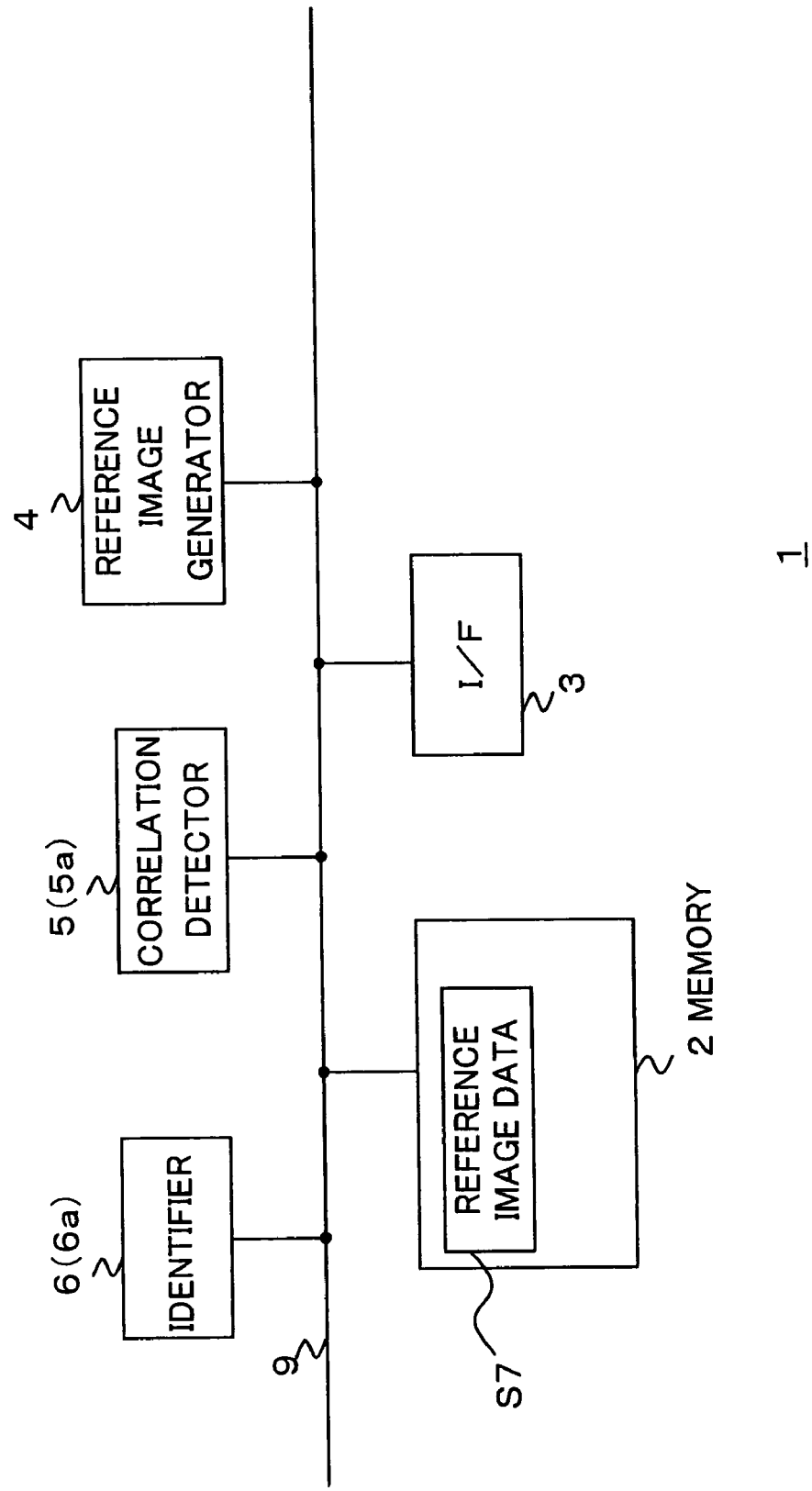
FIG. 1 is a view of the configuration of a data processing apparatus according to an embodiment of the present invention.

FIG. 1 is a view of the configuration of a data processing apparatus 1 of the present embodiment.

The data processing apparatus 1 identifies if a predetermined image generating apparatus generating image data based on light receiving results of a plurality of light receiving elements having distinctive variations in light receiving sensitivity, in this case a digital camera, and generates the image data to be identified.

As shown in FIG. 1, the data processing apparatus 1 for example has a memory 2, an interface 3, a reference image generator 4, a correlation detector 5, and an identifier 6 all connected via a bus 9.

Here, the reference image generator 4 corresponds to the reference image generating means of the present invention, the correlation detector 5 corresponds to the correlation detecting means of the present invention, and the identifier 6 corresponds to the identifying means of the present invention.

Note that the configuration of the data processing apparatus 1 shown in FIG. 1 is one example. It is also possible to realize the functions of at least one of the correlation detector 4 and the reference image generator by the identifier 6.

The memory 2 stores the image data generated based on the results of capture by a predetermined camera input through the interface 3 as reference image data S7 (second image data of present invention).

Here, the camera corresponds to the image generating apparatus of the present invention.

As the reference image data S7, for example, one displaying a pattern with no correlation with the pattern displayed based on the data S31 to be identified is used. For example, the camera captures a gray sheet of paper, air, etc. as a pattern to generate the reference image data S7.

The interface 3 receives as input image data generated based on captured results of a predetermined camera and outputs this to the memory 2 or reference image generator 4.

Further, the interface 3 receives as input image data to be identified (first image data of present invention) and outputs this to the memory 2 or identifier 6.

The predetermined camera has a plurality of light receiving elements arranged in a matrix. The light from the object being captured strikes the light receiving elements through a lens.

Further, the camera generates image data based on the light receiving results of the plurality of light receiving elements.

Here, the light receiving elements are for example charge coupled device (CCD) image pickup elements. There is distinctive variation in the light receiving intensity due to production. This variation is difficult to artificially reproduce.

Figure 2:
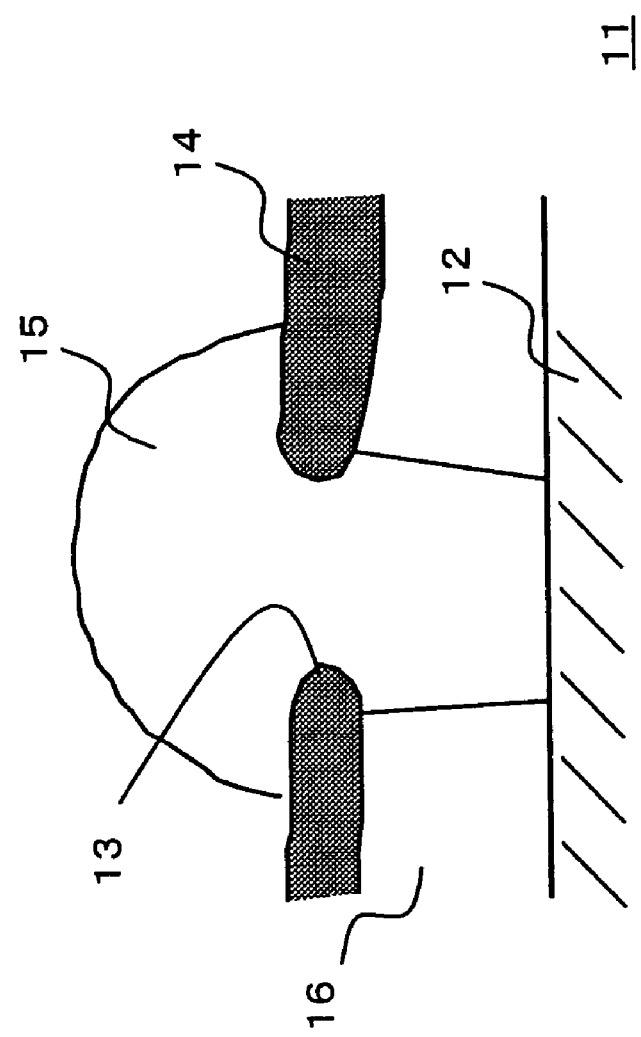
FIG. 2 is a view schematically showing a cross-section of a light receiving element provided in a camera.

FIG. 2 is a view schematically showing a cross-section of a light receiving element 11 provided in a camera.

As shown in FIG. 2, a light receiving element 11 has a silicon substrate 12, a light blocking layer 14 provided at an aperture 13, and a condensing lens 15.

The silicon substrate 12 is formed with a photo-electric conversion region at a position facing the aperture 13.

Further, the condensing lens 15 is formed so as to reach the silicon substrate 12 through the light blocking layer 14 from a position at an opposite side from the silicon substrate relative to the light blocking layer 14.

The aperture 13 is formed by microprocessing a resist for forming an etching mask by exposure by UV rays, then etching away the light blocking layer 14 and the insulating layer 16 under it.

The condensing lens 15 is formed by microprocessing a glass layer by photolithography, then melting the glass layer at a high temperature to obtain a spherical shape.

In the process of production of the above light receiving element 11, the aperture 13 is controlled to be formed to as uniform a shape as possible, but variation occurs in the shape due to various factors. Therefore, there is variation in the shapes of different apertures 14 of different light receiving elements.

Here, due to the variation in shapes of the apertures 13 of the different light receiving elements, there is variation in the shape of the light (light beams) striking the light receiving elements. The amount of the light striking the photo-electric conversion region of the silicon substrate 12 varies and therefore the light receiving sensitivity varies depending on the light receiving element.

This variation in the light receiving sensitivity is not artificial and is distinctive to each light receiving element like a fingerprint. Further, effects of the variation in the light receiving sensitivity of the light receiving elements appear in the image data generated by the camera using these light receiving elements.

In the present embodiment, as explained above, the variation in manufacture of the light receiving sensitivity of the light receiving elements arising in the image data generated by the camera is utilized to identify if image data to be identified was captured by a predetermined camera.

The reference image generator 4, in accordance with need, uses one or more image data input from the interface 3 to generate reference image data and writes this in the memory 2.

The correlation detector 5 detects correlation between the image data to be identified input through the interface 3 and the reference image data S7 read from the memory 2 and generates correlation data S5 showing the detection results.

The correlation detector 5 outputs the correlation data to the identifier 6.

Below, an explanation will be given of a correlation detector 5 using the symmetrical phase only matched filtering (SPOMF) system.

The SPOMF system is described in "Symmetric Phase-Only Matched Filtering of Fourier-Mellin Transforms for Image Registration and Recognition", *IEEE Transaction on Pattern Analysis and Machine Intelligence*, vol. 16, no. 12, December. 1994 etc.

Figure 3:
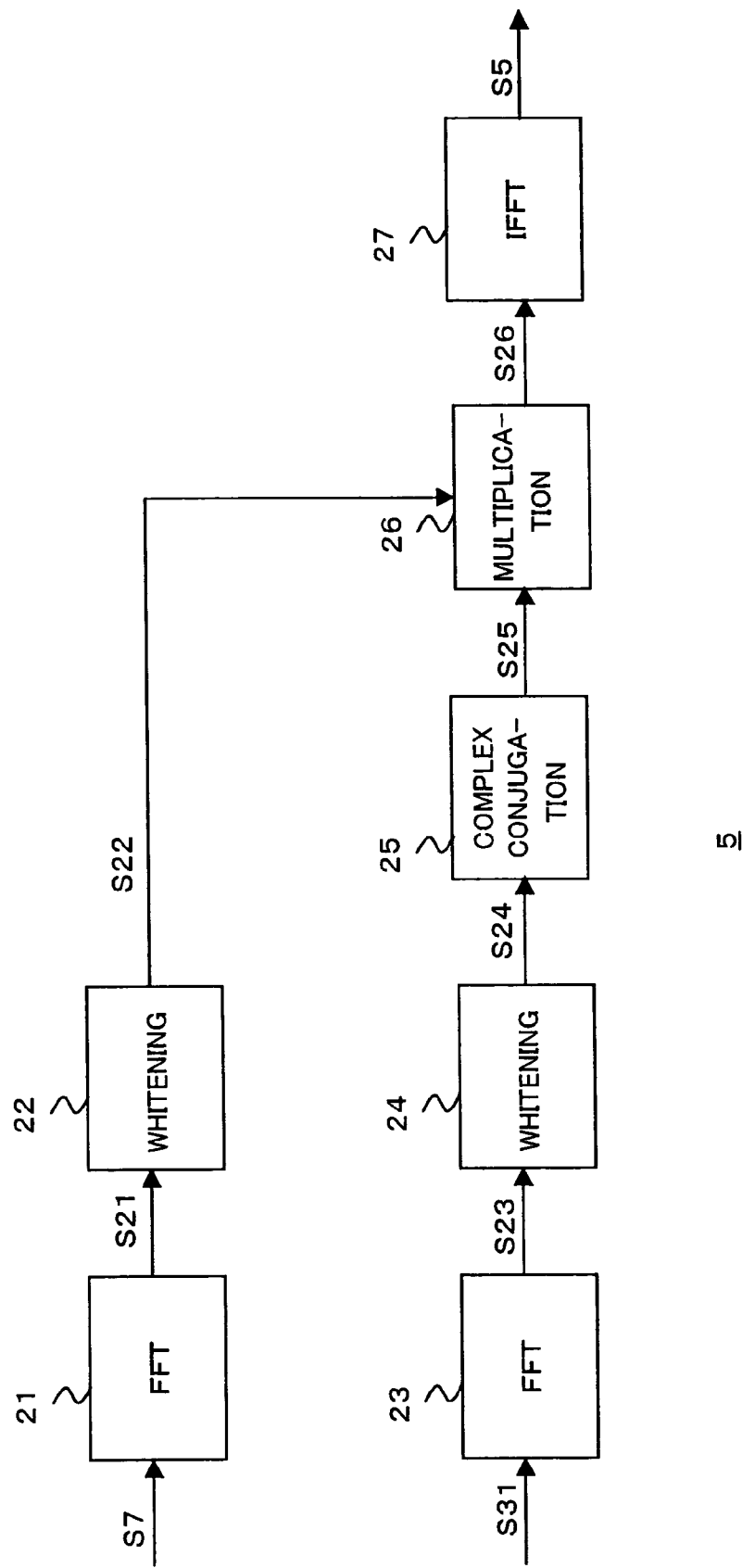
FIG. 3 is a block diagram of the functions of a correlation detector shown in FIG. 1.

FIG. 3 is a block diagram of the functions of the correlation detector 5 shown in FIG. 1.

As shown in FIG. 3, the correlation detector 5 has for example a Fast Fourier Transform (FFT) circuit 21, a whitening circuit 22, an FFT circuit 23, a whitening circuit 24, a complex conjugation circuit 25, a multiplication circuit 26, and an IFFT circuit 27.

The FFT circuit 21 and the FFT circuit 23 correspond to transforming circuits of the present invention, the whitening circuit 22 and the whitening circuit 25 correspond to the dividing means of the present invention, the complex conjugation circuit 25 corresponds to the substituting means of the present invention, the multiplication circuit 26 corresponds to the multiplication circuit of the present invention, and the IFFT circuit 27 corresponds to the inversion transformation circuit of the present invention.

The FFT circuit 21 for example applies a Fourier transform to the reference image data S7 read from the memory 2 to generate second frequency component data S21 and outputs this to the whitening circuit 22.

The whitening circuit 22 divides each of the complex number data forming the second frequency component data S21 by an absolute value of each complex number data (that is, makes the absolute values of the element data equal) to generate second complex number data S22 and outputs this to the multiplication circuit 26.

The FFT circuit 23 for example applies a Fourier transform to the image data S31 to be identified input through the interface 3 to generate the first frequency component data S23 and outputs this to the whitening circuit 24.

The whitening circuit 24 divides each of the complex number data forming the first frequency component data S23 by an absolute value of each complex number data to generate first complex number data S24 and outputs this to the complex conjugation circuit 25.

The complex conjugation circuit 25 substitutes each complex number data forming the first complex number data S24 with complex conjugate complex number data to generate third complex number data S25 and outputs this to the multiplication circuit 26.

The multiplication circuit 26 multiplies the second complex number data S22 and the third complex number data S25 to generate fourth complex number data S26 and outputs this to the IFFT circuit 27.

The IFFT circuit 27 applies an inverse Fourier transform to the fourth complex number data S26 to generate correlation data S5 and outputs this to the identifier 6.

Figure 4:
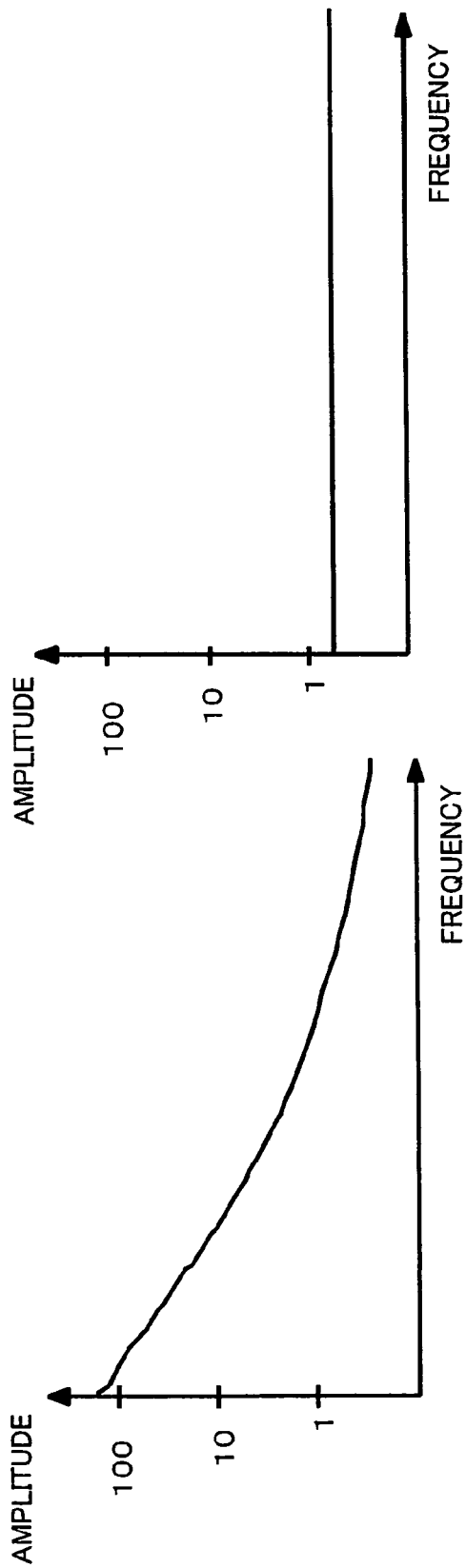
FIGS. 4A and 4B are views for explaining a natural image and a distinctive pattern of a light receiving element.

Here, the correlation data indicates all values for which correlation is obtained by cyclically shifting the relative positions of the image data S31 to be identified and the reference image data S7 in two dimensions. However, as shown in FIG. 4A, in a natural image, the energy of the image concentrates at the low band. As opposed to this, the variation in sensitivity of pixels of light receiving elements is a random phenomenon, so a component superposed on an image due to variation in sensitivity has a substantially equivalent energy at a high frequency band like white noise as shown in FIG. 4B.

In matching by SPOMF, after conversion to the frequency domain, the absolute values of the elements are made equal. Therefore, matching of a pattern of variation in pixel sensitivity becomes possible without being disturbed by the low band signal of the natural image.

The identifier 6 comprehensively controls the operations of the components of the data processing apparatus 1.

The identifier 6 judges if the image data S31 to be identified was generated using a predetermined camera generating the reference image data S7 based on the correlation data S5 generated by the correlation detector 5.

However, as explained above, as the reference image data S7, for example, one for displaying a pattern without correlation with the pattern to be displayed based on the data S31 to be identified for example is preferable.

Therefore, when the cameras generating the image data S31 to be identified and the reference image data S7 differ, the image data S31 to be identified and the reference image data S7 become uncorrelated. That is, a large value does not occur at the origin of the correlation data S5.

On the other hand, when the cameras generating the image data S31 to be identified and the reference image data S7 are the same, the image data S31 to be identified and the reference image data S7 have correlation due to the effects of the distinctive light receiving sensitivity of the light receiving elements explained above.

The identifier 6 identifies that the image data S31 to be identified and the reference image data S7 were generated (captured) by the same camera when the correlation value indicated by the correlation data S5 exceeds a predetermined value based on the correlation data S5 detected by the correlation detector 5.

Next, the method of determination of the value used for the standard for identification by the identifier 6 will be explained.

As explained above, the correlation data S5 shows all values of values where correlation is obtained by cyclically shifting the relative positions between the image data S31 to be identified and the reference image data S7 in two dimensions.

Here, since the image data S31 to be identified and the reference image data S7 are uncorrelated in pattern, the values other than the origin of the correlation data S5 show correlation values between uncorrelated data.

The identifier 6 finds the standard error σ of the correlation data S5 and makes the identification based on the standard of whether the value C00 of the origin of the correlation data S5 exceeds a predetermined multiple of the standard error.

The value C00 is used because when obtaining the correlation between images as a whole, the distinctive patterns of image pickup elements match in the state with the origins made to match, so a peak appears at the output C00 of the correlator in that case.

The element data in the correlation data S5 are designated as Cij and the number of element data is made "n".

The identifier 6 generates the mean value "mean" of the values indicated by all element data in the correlation data S5.

$$c\text{mean} = (\Sigma c_{ij})/n \quad (1)$$

Further, the identifier 6 uses the above mean value "mean" to generate the standard error σ based on equation (2):

$$\sigma = \sqrt{\{\{\Sigma(c_{ij}-c\text{mean})\times(c_{ij}-c\text{mean})\}/n\}} \quad (2)$$

Further, the identifier 6 identifies that the image data S31 to be identified and the reference image data S7 were generated by the same camera when the value indicated by the element data c00 of the origin in the correlation data S5 exceeds 10 times the standard error σ based on equation (3):

$$c00 > 10 \times \sigma \quad (3)$$

As explained above, in the data processing apparatus 1, by obtaining the correlation between images by SPOMF, whether these images were generated by the same camera provided with the same light receiving elements is identified.

The probability of accurately making the identification (matching) can be quantized as follows.

The results of matching between data distributed at random can be considered to follow normal distribution. When matching image data captured by different light receiving elements, the two sets of data can be considered uncorrelated. The probability of the value of correlation between uncorrelated data exceeding 10 σ is $7.6 \times 10^{-24}$.

Next, the overall operation of the data processing apparatus 1 shown in FIG. 1 will be explained.

Figure 5:
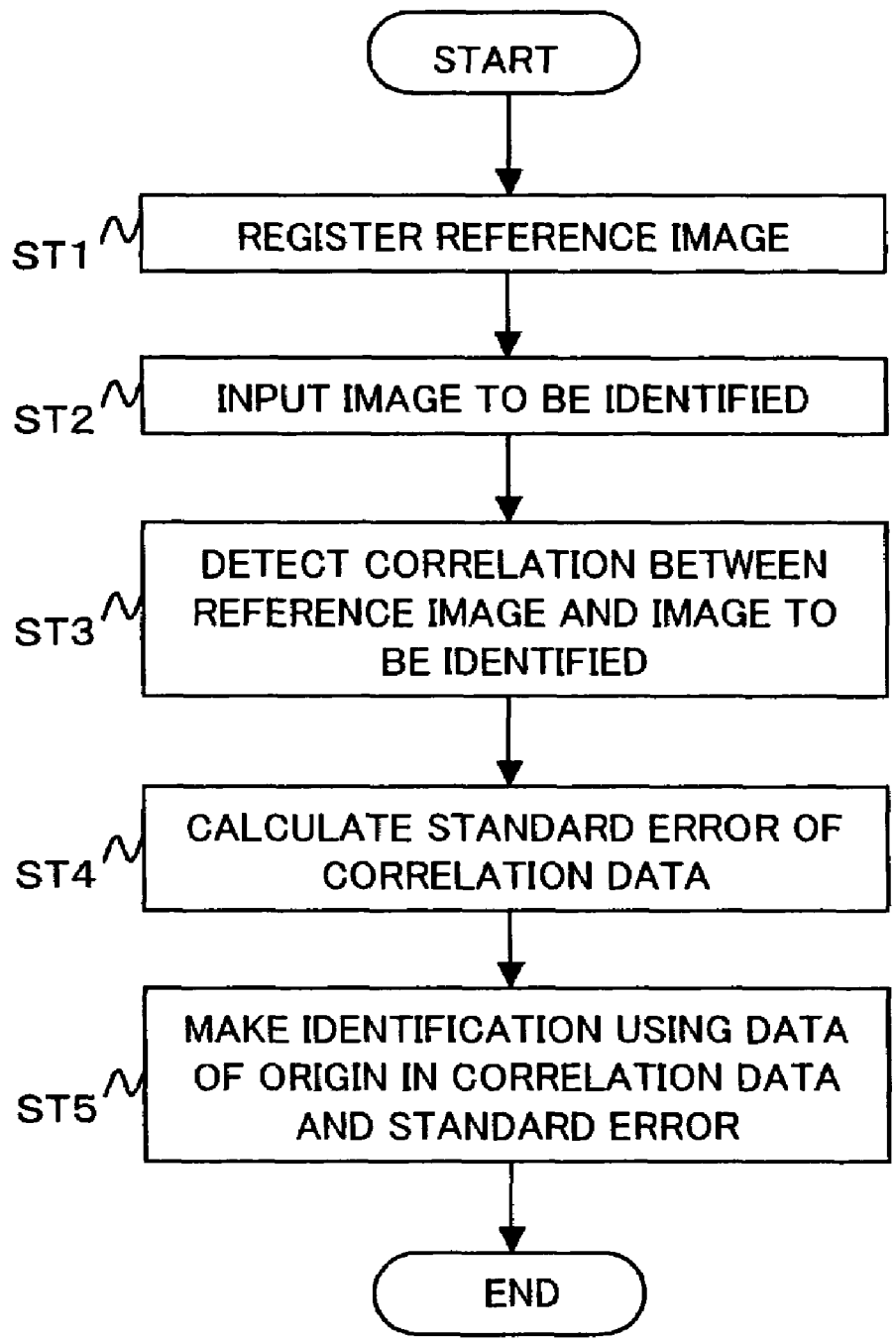
FIG. 5 is a flow chart for explaining the operation of a data processing apparatus shown in FIG. 1.

FIG. 5 is a flow chart for explaining this operation.

Step ST1

For example, the reference image data S7 captured by the camera to be identified is input through the interface 3 and written in the memory 2.

Step ST2

The image data S31 to be identified is input through the interface 3 and output to the correlation detector 5.

Step ST3

The correlation detector 5, as explained above, detects the correlation between the image data S31 to be identified input through the interface 3 and the reference image data S7 read from the memory 2 to generate the correlation data S5 showing the detection results.

Step ST4

The identifier 6 calculates the standard error σ of the correlation data S5 based on equations (1) and (2).

Step ST5

The identifier 6 judges whether the value C00 of the origin of the correlation data S5 is larger than a predetermined multiple, for example, 10, of the standard error σ calculated. When it judges it to be larger, it identifies that the image data S31 to be identified and the reference image data S7 were generated by the same camera, while when it does not, it identifies them as being generated by different cameras.

As explained above, according to the data processing apparatus 1, without adding information specifying the camera generating the image data to the image data as electronic watermark information or a header of an image file, it is possible to identify whether image data to be identified was generated using a particular camera for all cameras with registered reference image data S7.

Therefore, according to the data processing apparatus 1, by registering reference image data S7, it is possible to identify that image data to be identified was generated using a particular camera even when the camera itself is not present.

Next, techniques for raising the precision of the above identification will be explained.

[First Technique]

Figure 6:
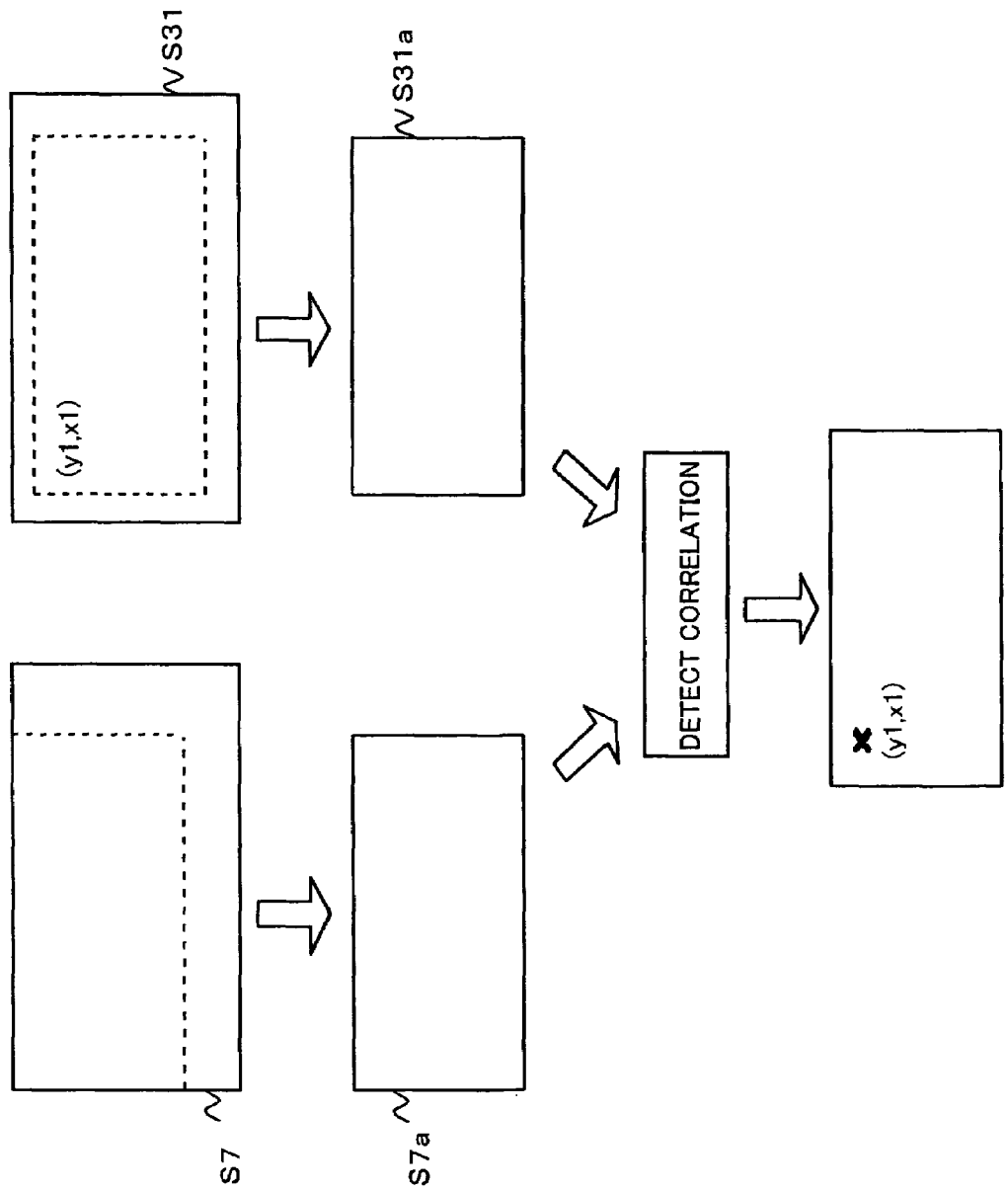
FIG. 6 is a view for explaining a first technique for improving the precision of identification of the data processing apparatus shown in FIG. 1.
Figure 7:
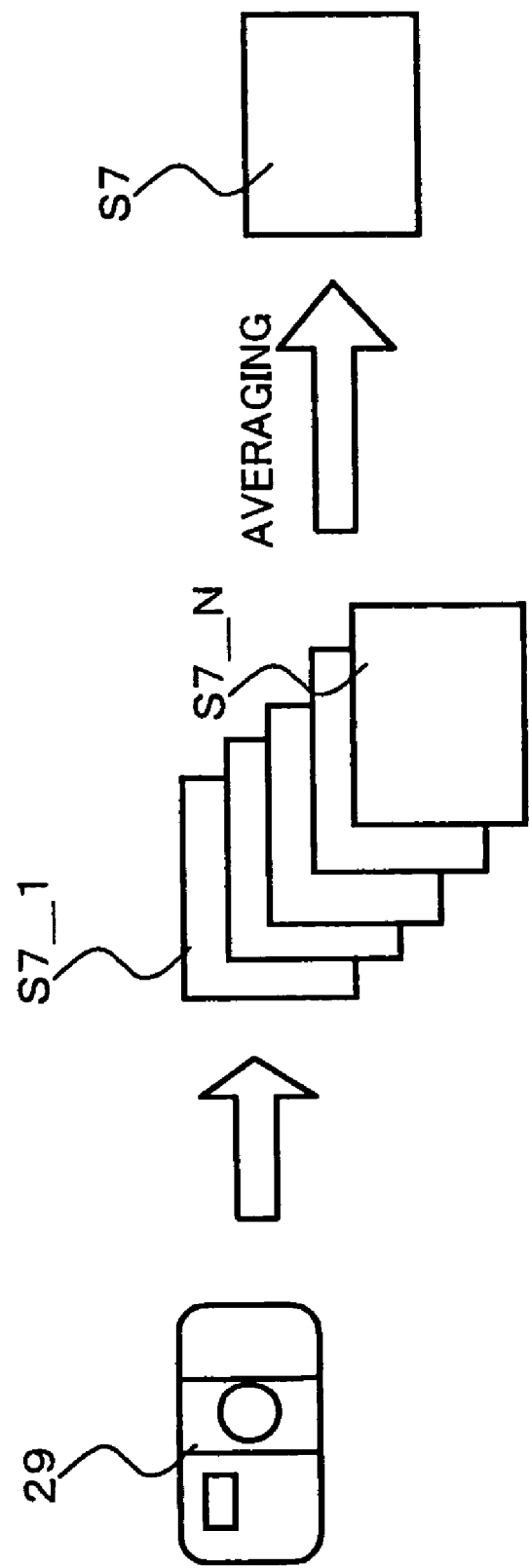
FIG. 7 is a view for explaining a second technique for improving the precision of identification of the data processing apparatus shown in FIG. 1.

For example, as shown in FIG. 6, the correlation detector 5 cuts out the image data S7a (fourth image data of present invention) from the reference image data S7 based on a first cutout position.

Further, the correlation detector 5 cuts out the image data S31a (third image data of present invention) from the image data S31 to be identified based on a second cutout position shifted by exactly (x1,y1) from the first cutout position.

Further, the correlation detector 5 detects the correlation between the image data S7a and S31a.

In this case, since SPOMF expresses the strength of correlation when successively cyclically shifting the image, when the image data S31 to be identified and the reference image data S7 have been generated by the same camera, a peak appears at the element data of the point of (y1,x1) in the correlation data.

Further, the correlation detector 5 changes the first cutout position and the second cutout position several times to generate the correlation data S5. This correlation data S5 is used for the identifier 6 to successively make its identification.

Due to this, it is possible to lower the probability of misidentification by the identifier 6 using the correlation data S5. That is, the probability of misidentification becomes the product of the probabilities of misidentification at these identifications. For example, if the peak value is 3σ, the probability of misidentification is $1 \times 10^{-3}$ with a single identification, but by making the identification while changing the cutout positions 10 times, it is possible to lower the probability of misidentification to $1 \times 10^{-30}$.

[Second Technique]

The image data generated by the camera is comprised of the distinctive pattern of light receiving sensitivity of the light receiving elements and noise due to heat and electrical factors superposed on the image formed by light through the lens.

Further, the amplitude of the image data is quantized to 8 bits at the most.

To avoid the effects of lens imaging, noise, and quantization, it is extremely useful to use the average of a plurality of reference image data S7_1 to S7_N.

In this case, the N (N is an integer of 2 or more) number of reference image data S7_1 to S7_N generated using the camera 29 are output through the interface 3 to the reference image generator 4.

Further, the reference image generator 4 takes the average of the reference image data S7_1 to S7_N to generate the reference image data S7 and writes it in the memory 2.

As a result of experiments, it is effective to increase the number of the reference image data S7_1 to S7_N to several hundred. The value of correlation rises to about double compared with the case of using single reference image data.

[Third Technique]

As explained above, in the above camera, light strikes the light receiving elements through a lens.

FIGS. 8A and 8B to FIGS. 10A and 10B show the states of focusing light passing through the lens 31 at a photo-electric conversion region 32 of a light receiving element.

FIGS. 8A and 8B are views of the case of opening the aperture 30 at a wide angle, FIGS. 9A and 9B are views of the case of closing the aperture 30 at a wide angle, FIG. 10A is a view showing the case of opening the aperture 30 at a zoom state, and FIG. 10B is a view showing the case of closing the aperture 30 at a zoom state.

As will be understood from these figures, the state of the light striking the photo-electric conversion region 32 differs.

As will be explained above, the variation in light receiving sensitivity of the light receiving elements is due to the amount of light striking the light receiving elements, so the state of variation also differs depending on the diameter of the aperture 30.

Figure 11:
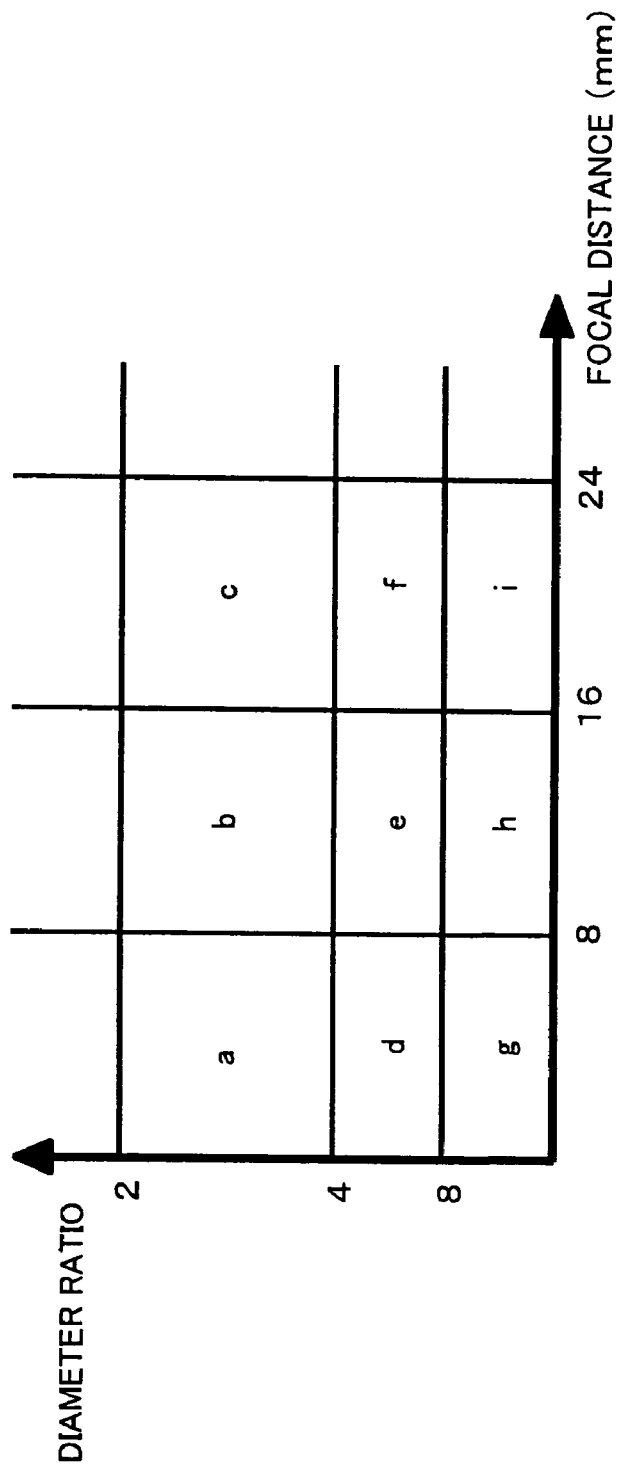
FIG. 11 is a view for explaining a third technique for improving the precision of identification of the data processing apparatus shown in FIG. 1.

In the present embodiment, as shown in FIG. 11, it is also possible to generate a plurality of image data "a" to "i" based on the diameter ratio of different apertures 30 and focal distances and use these as the reference image data S7 for the correlation detector 5 to generate the correlation data S5.

According to experiments, by preparing the plurality of image data "a" to "i" as the reference image data S7 in this way, the value of the correlation rises to about 1.5 times the case of preparing single image data. Due to this, the precision of identification by the identifier 6 is improved.

Next, a first example of application of the data processing apparatus 1 will be explained.

FIRST EXAMPLE OF APPLICATION

This example of application corresponds to the third and fourth aspects of the invention.

The data processing apparatus 1 can be applied to the case of identifying the camera capturing an image from the image data.

As explained above, by obtaining the correlation between image data, it is possible to identify whether an image was captured by the same camera or the image was captured by a different camera.

Therefore, which of a plurality of cameras image data was captured by is identified as follows.

Figure 12:
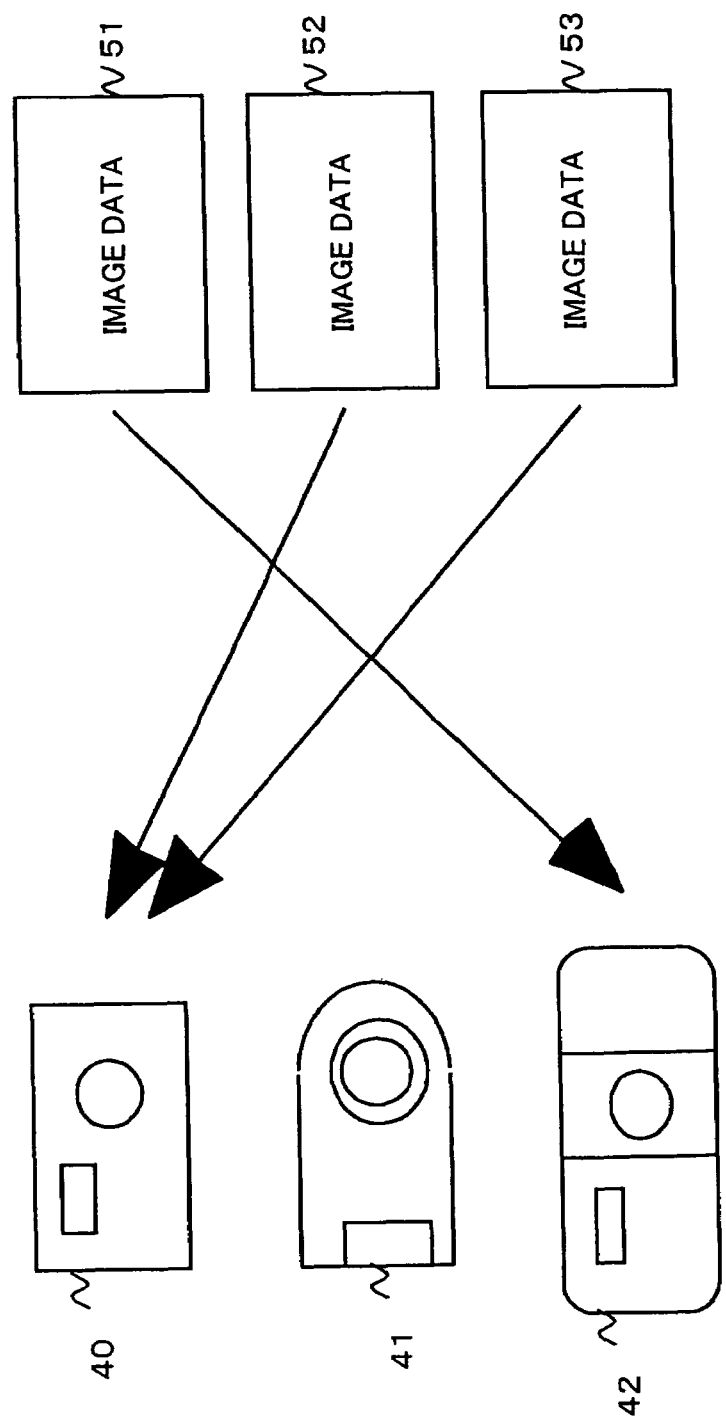
FIG. 12 is a view for explaining a first example of application of the data processing apparatus shown in FIG. 1.

For example, as shown in FIG. 12, consider the case where there are cameras 40, 41, and 42.

Figure 13:
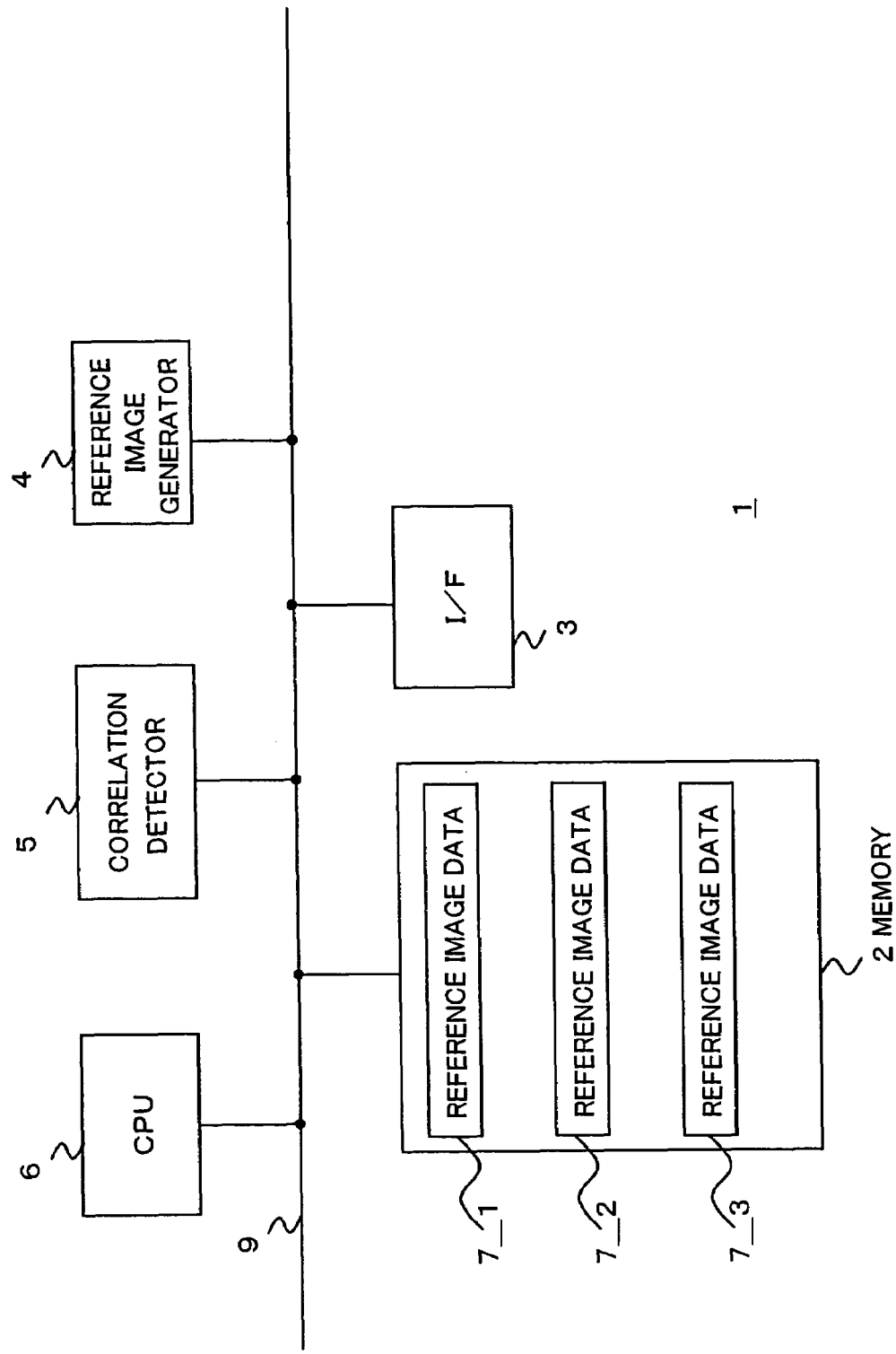
FIG. 13 is a view for explaining a second example of application of the data processing apparatus shown in FIG. 1.

In this case, as shown in FIG. 13, the cameras 40, 41, and 42 capture the image of a predetermined object and generate reference image data S7_1, S7_2, and S7_3 corresponding to the captured results.

At this time, the object is preferably one of a uniform brightness with no pattern such as the blue sky. By this, it is possible to generate reference image data of no correlation in pattern with the image data S31 to be identified. Further, similar effects can be obtained even if arranging a milky white filter immediately before the lens of the camera.

Further, as shown in FIG. 13, the reference image data S7_1, S7_2, and S7_3 input through the interface 3 of the data processing apparatus 1 are written in the memory 2.

Further, the correlation detector 5 generates the correlation data S5 with the image data S31 to be identified for the cases of using the reference image data S7_1, S7_2, and S7_3.

Further, the identifier 6 specifies the correlation data exhibiting a large peak at the position of the origin among the correlation data S5 in the case of using the reference image data S7_1, S7_2, and S7_3 and identifies that it was captured by a camera corresponding to the reference image data used for generation of that correlation data.

Due to this, as shown in FIG. 12, when there are the image data 51, 52, and 53, by using the data processing apparatus 1 shown in FIG. 13 to discriminate these as the image data S31 to be identified, it is possible to specify the cameras 40, 41, and 42 capturing the image data 51, 52, and 53.

SECOND EXAMPLE OF APPLICATION

It is also possible to apply the data processing apparatus 1 to the case of identifying the existence of tampering of image data.

A predetermined camera is used to capture an image in advance to generate the reference image data S7 and stores the reference image data S7 in the data processing apparatus 1.

Further, when receiving the image data generated by the camera, the data processing apparatus 1 is used to make the above identification using the received image data as the image data S31 to be identified and to identify if the received image data is the legitimate image captured by that predetermined camera.

When the image is not captured by the predetermined camera and just the header information of the existing image was tampered with before transmission, there will be no correlation with the reference image data S7, so it is possible to identify the received image data as being illegitimate.

Note that as explained above, when obtaining correlation at the correlation detector 5, correlation is no longer exhibited if the image is scaled, deformed, or rotated. Therefore, when part of the image has been cut out and enlarged, half of the image has been enlarged and half reduced, the image has been rotated several degrees, or other tampering performed, correlation is no longer exhibited, so it is learned that the image is not the original one.

THIRD EXAMPLE OF APPLICATION

For example, when it is identified by the second example of application that the received image data was generated (captured) by a legitimate camera, electronic watermark data (additional data) is embedded in the received image data as a powerful image identifier.

By embedding electronic watermark data in this way, it is possible to impart to an image information relating to an image including an image copyright by using a means easily detectable even after filtering, deformation, or other operations.

Figure 14:
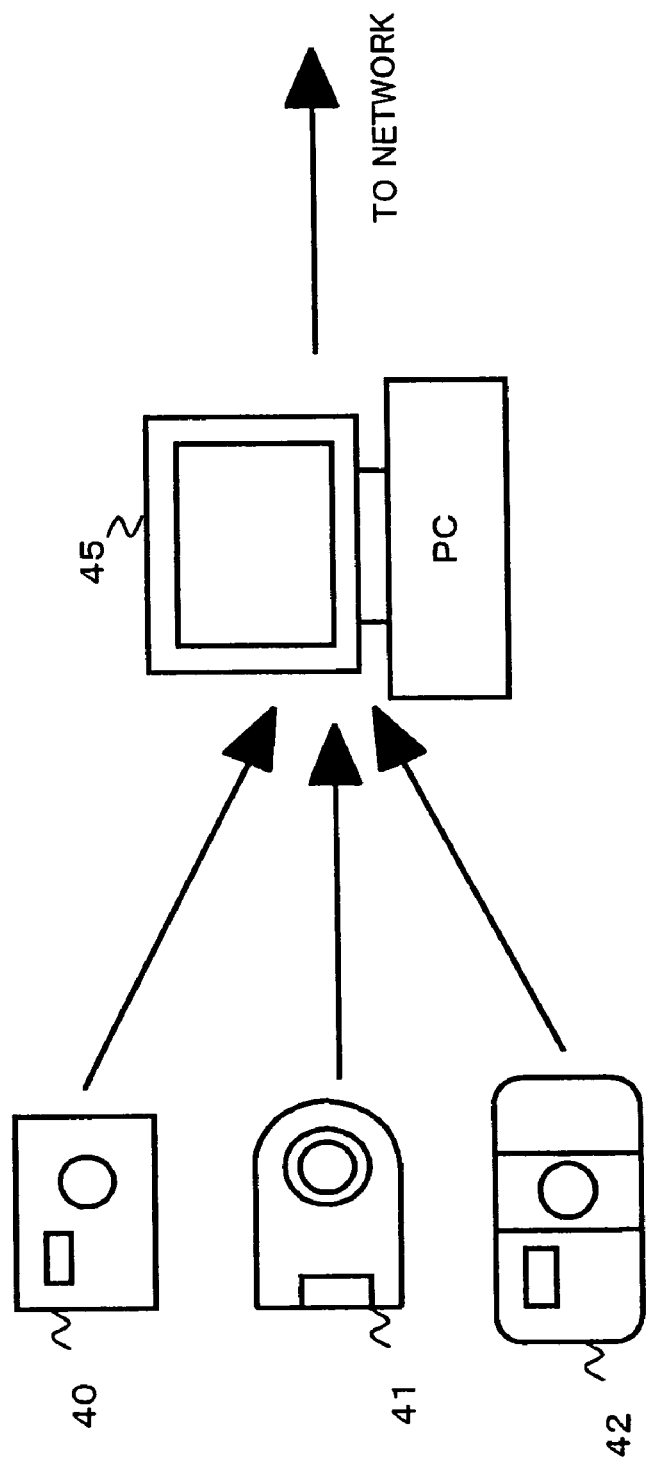
FIG. 14 is a view for explaining a third example of application of the data processing apparatus shown in FIG. 1.

Further, as shown in FIG. 14, a computer 45 receives as input image data from the cameras 40, 41, and 42 and identifies if they are legitimate image data with registered reference image data S7.

Further, the computer 45 embeds electronic watermark data in the image data and outputs the result to the network when identifying image data as being legitimate.

Due to this, the computer 45 can prevent electronic watermark data from being embedded when receiving illegitimate image downloaded through the network.

FOURTH EXAMPLE OF APPLICATION

The data processing apparatus 1 may also be applied to the case of identifying the existence of tampering of moving image data.

In this case, the image data generated by a legitimate video camera is written into the memory 2 of the data processing apparatus 1 as the reference image data S7.

FIG. 15A is a view for explaining moving image data S60 generated by a legitimate video camera.

As shown in FIG. 15A, the moving image data S60 is comprised of a header and scenes (image data 1 to 6.

FIG. 15B is a view for explaining moving image data S61 illegitimately tampered with.

As shown in FIG. 15B, the moving image data S61 has the scene 3 of the moving image data S60 shown in FIG. 15A substituted with the illegitimate scene 3A captured by a camera other than the legitimate video camera.

The data processing apparatus 1 for example successively receives as input the scenes of the moving image data S61 and obtains correlation with the reference image data S7 so as to enable it to identify that the scene 3A was illegitimately tampered with.

That is, for the scenes 1, 2, 4, and 5 of the moving image data S61, correlation with the reference image data S7 exceeding a predetermined value can be obtained, but for the scene 3A, correlation exceeding the predetermined value cannot be obtained.

In this case, it is also possible to attach the reference image data generated by the legitimate video camera to the header of the moving image data etc. and have the data processing apparatus 1 use that reference image data S7.

FIFTH EXAMPLE OF APPLICATION

In this example of application, the explanation will be given of the case of identifying whether part of the image data S31 to be identified was generated based on image data generated by the camera generating the reference image data S7 (partially tampered image).

This example of application corresponds to the 11th and 12th aspects of the invention.

Figure 16:
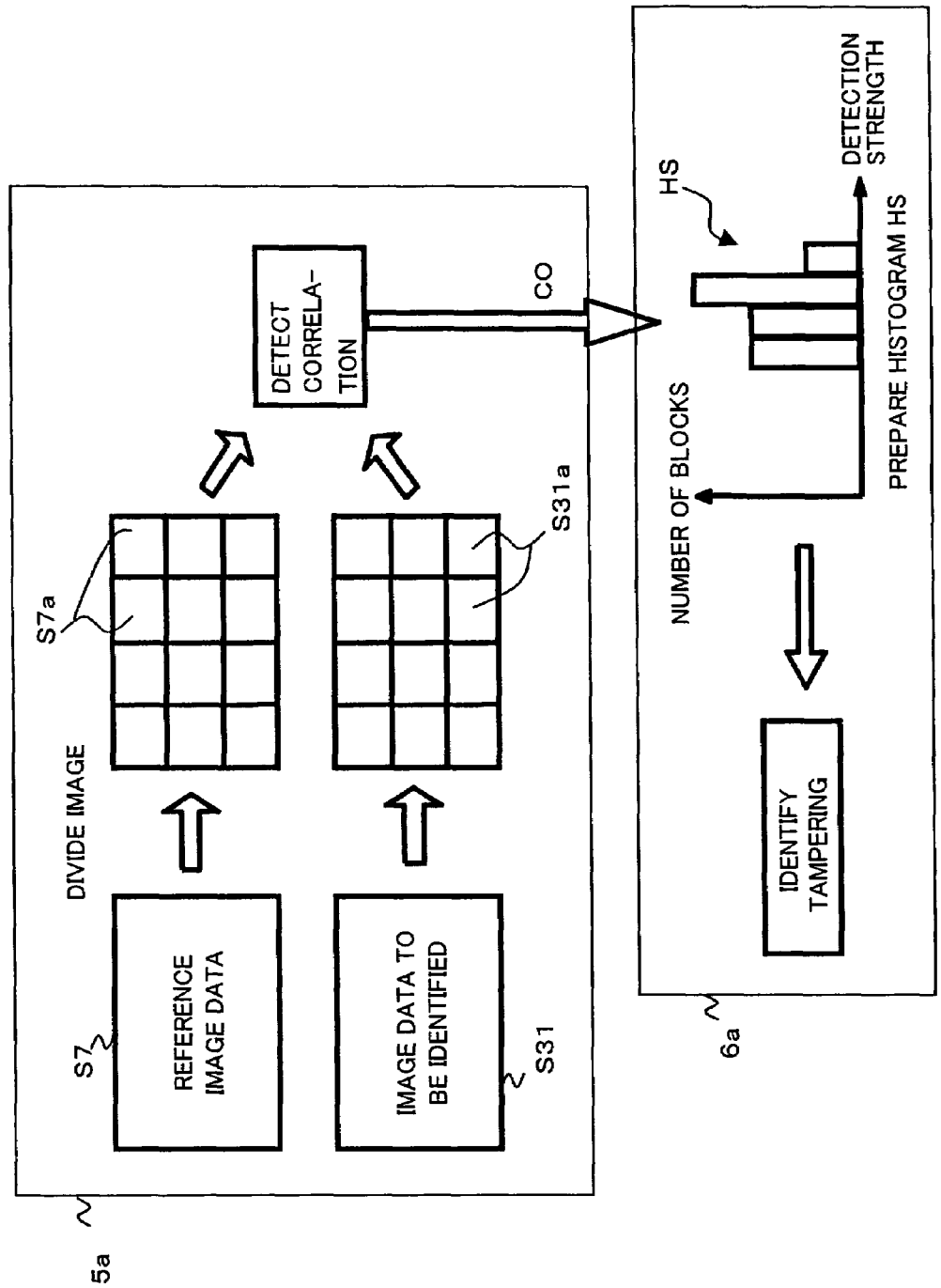
FIG. 16 is a view for explaining a fifth example of application of the data processing apparatus shown in FIG. 1.

FIG. 16 is a view for explaining this example of application.

As shown in FIG. 16, in this example of application, the correlation detector 5a shown in FIG. 1 receives as input the reference image data S7 and divides it into the plurality of block image data S7a.

Further, the correlation detector 5a receives as input the image data S31 to be identified and divides it into the plurality of block image data S31a.

This division by the correlation detector 5a is performed based on the same boundaries when the reference image data S7 and the image data S31 to be identified are the same size.

Here, the reference image data S7 and the image data S31 to be identified are for example two-dimensional images of 600 pixels vertically and 800 pixels horizontally.

The block image data S7a and S31a are for example two-dimensional images of 200 pixels vertically and horizontally.

The correlation detector 5a detects the correlation between the block image data S31a and the block image data S7a corresponding to that block image data S31a in the plurality of block image data S7a for each of the plurality of block image data S31a. The method of detection of correlation is based on the above SPOMF. In this case, the correlation value of the origin is normalized by the standard error found from the values of all points of output of SPOMF.

Further, the correlation detector 6a outputs the detected correlation CO to the identifier 6a for each of the plurality of block image data S31a.

The identifier 6a identifies if the image data S31 to be identified was generated by partially tampering with image data generated by the camera generating the reference image data S7 based on the distribution of the detection strengths exhibited by the correlation CO based on the correlation CO input from the correlation detector 5a.

Figures 17A, 17B:
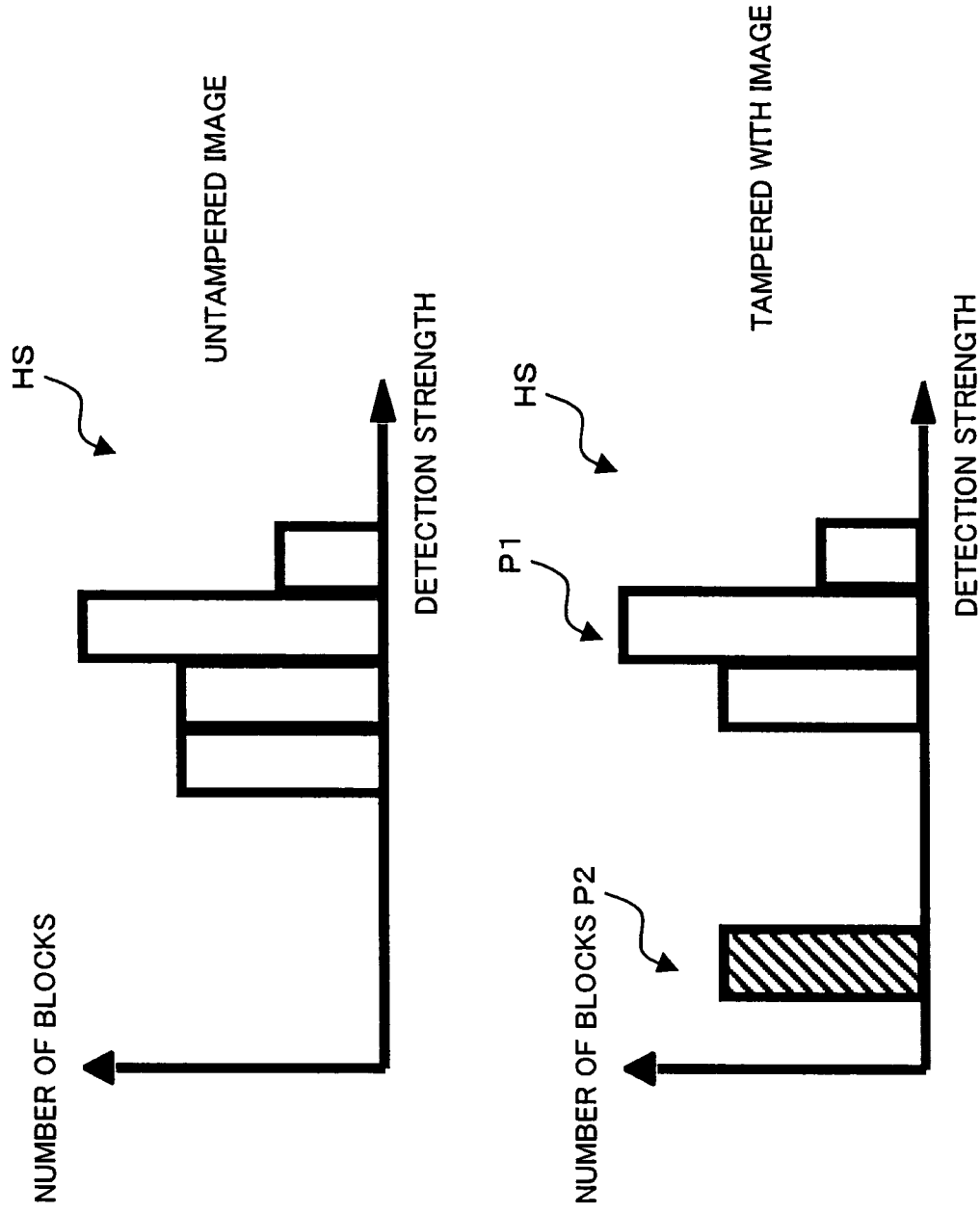
FIGS. 17A and 17B are views for explaining the processing of an identifier shown in FIG. 16.

Specifically, the identifier 6a, as shown in FIGS. 17A and 17B, generates a histogram HS showing the correspondence of the detection strengths of the correlation CO and the number of block image data showing a detection strength within each detection strength range and makes the above identification based on that histogram HS.

The identifier 6a performs the above identification based on the following.

That is, when the image data S31 to be identified has not been tampered with, as shown in FIG. 17A, the detection strengths of the correlations exhibited by the histogram HS fall within a predetermined range centered on a certain value. That is, they form a single group.

As opposed to this, when the image data S31 to be identified has been tampered with, as shown in FIG. 17B, the detection strengths of the correlations exhibited by the histogram HS has one peak P1 where the detection strength of the correlation exceeds a predetermined level and another peak P2 where the detection strength of the correlation does not exceed that predetermined level. That is, they form two groups. Here, the part corresponding to the peak P1 is the part using the image of the camera generating the reference image data S7, while the part corresponding to the peak P2 is the part using an image other than that of the camera.

The identifier 6a identifies that the image data S31 to be identified is not a result of partial tampering with the image generated by the camera when the histogram HS generated has only a single peak exceeding the predetermined level.

On the other hand, the identifier 6a identifies that the image data S31 to be identified is a result of partial tampering with the image generated by the camera when the histogram HS generated has a single peak exceeding the predetermined level and a peak other than the same.

Next, an example of operation of the data processing apparatus of this example of application will be explained.

Figure 18:
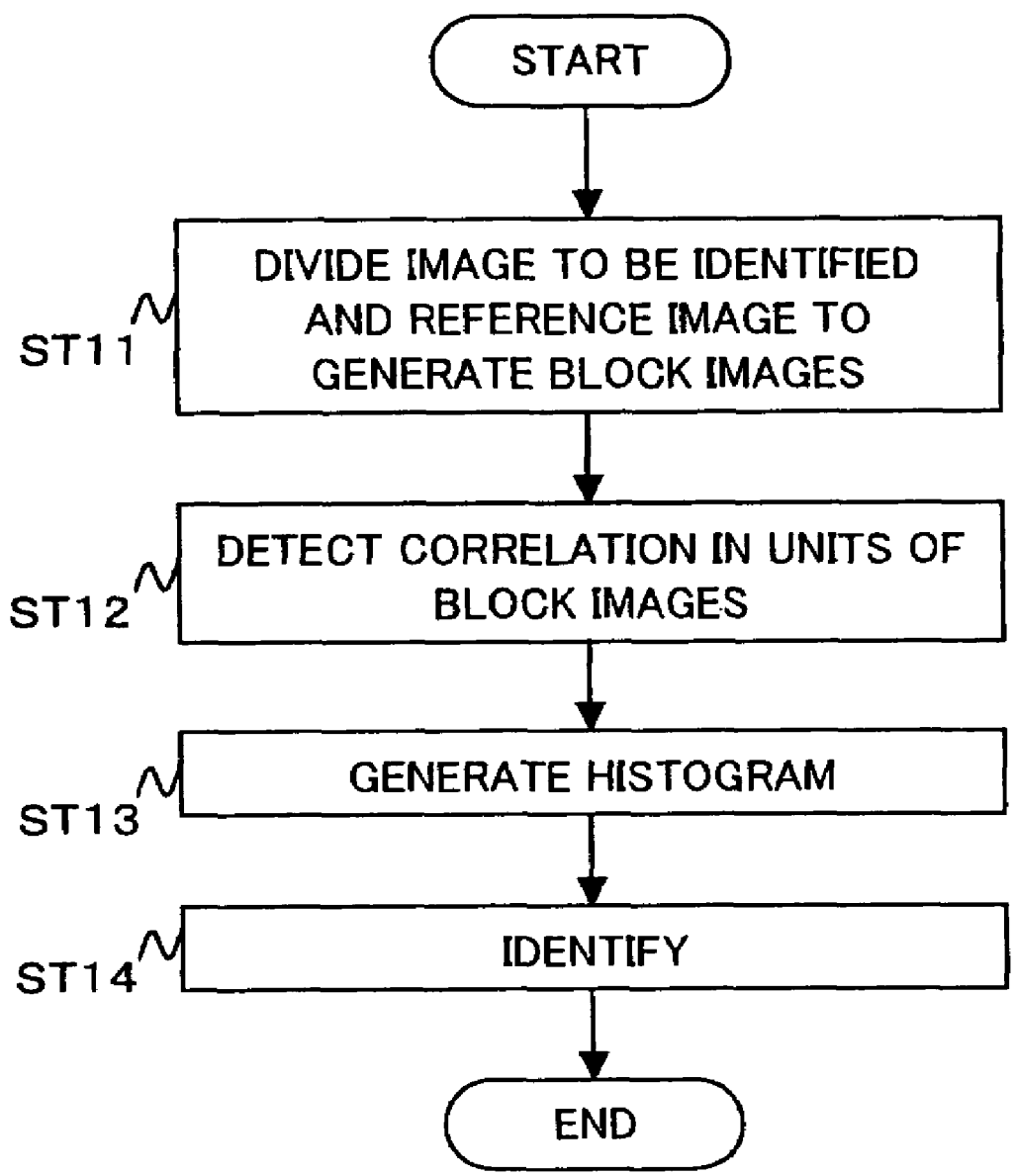
FIG. 18 is a flow chart for explaining an example of operation of the data processing apparatus shown in FIG. 16.

FIG. 18 is a view for explaining this example of operation.

Step ST11

The correlation detector 5a shown in FIG. 1 and FIG. 16 receives as input the reference image data S7 and divides it into a plurality of block image data S7a.

Step ST12

The correlation detector 5a detects the correlation between the block image data S31a and the block image data S7a corresponding to that block image data S31a in the plurality of block image data S7a for each of the above plurality of block image data S31a.

Step ST13

The identifier 6a, as shown in FIG. 16, generates a histogram HS showing the correspondence between the detection strength of the correlation CO and the number of block image data showing detection strengths in different detection strength ranges.

Step ST14

The identifier 6a identifies that the image data S31 to be identified is not a result of partial tampering with the image generated by the camera when the histogram HS generated at step ST13 has only a single peak exceeding the predetermined level.

On the other hand, the identifier 6a identifies that the image data S31 to be identified is a result of partial tampering with the image generated by the camera when the histogram HS generated at step ST13 has a single peak exceeding the predetermined level and a peak other than the same.

The data processing apparatus explained above using FIG. 16 to FIG. 18 can be applied to a system for identifying whether an image carried on a homepage or an image bulletin board on a network was generated by tampering with another image.

Figure 19:
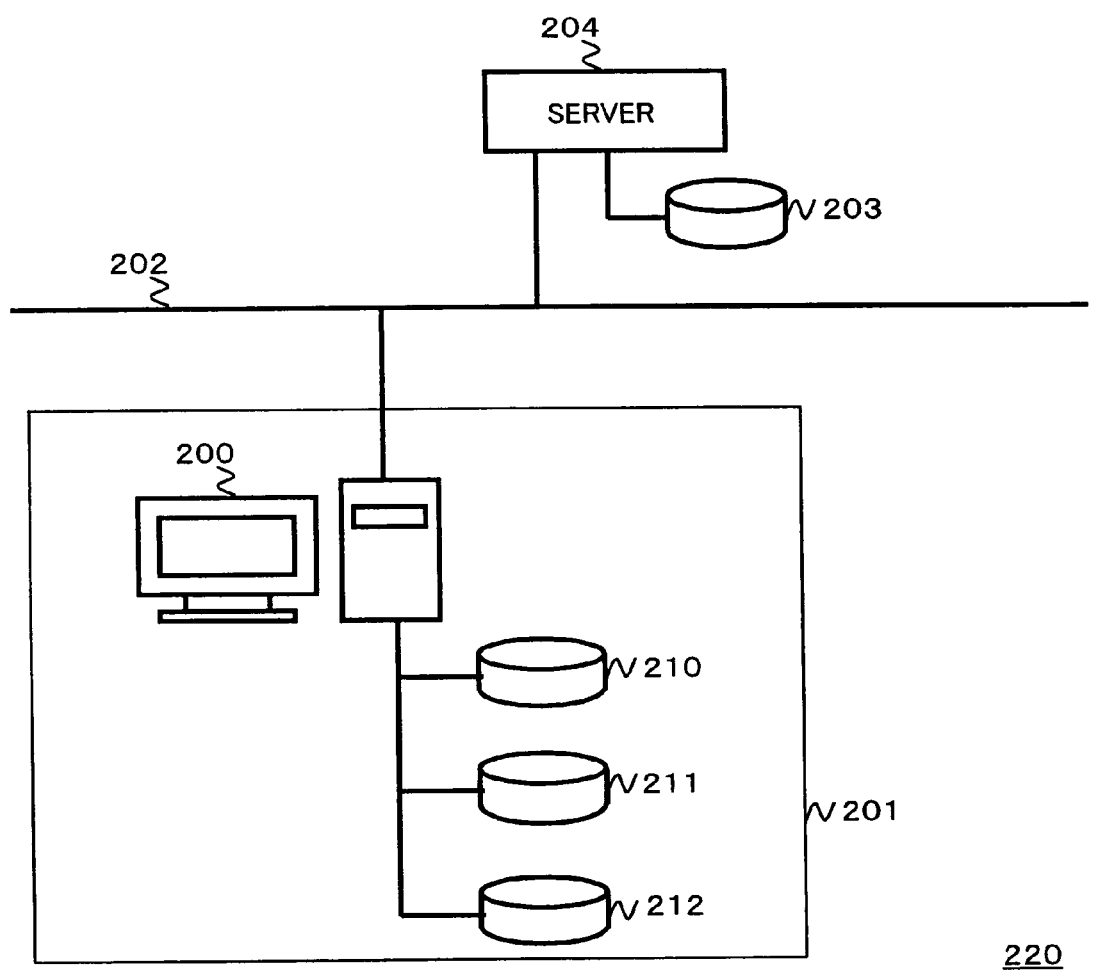
FIG. 19 is a view of the configuration of a system for identifying tampering applying the data processing apparatus shown in FIG. 16.

FIG. 19 is a view of the configuration of the system 220.

As shown in FIG. 19, the system 220 for example has a personal computer (PC) 200 and data bases 210, 211, and 212.

The PC 200 uses the image data provided by one or more servers 204 on a network 202 as the image data S31 to be identified and makes the above identification by detecting the correlation with the reference image data S7 read from the database 211.

The database 210 for example stores addresses of images of homepages or bulletin boards provided by one or more servers 204 connected on the network 202.

The database 211 for example stores the reference image data S7 generated by one or more predetermined cameras.

The database 212 stores the addresses (URL) of the image data on the network 202 used by tampering with image data generated from a camera the same as the reference image data S7 stored in the database 211.

In the system 220 shown in FIG. 19, the correlation detector 5a of the PC 200 uses the image data read out from the databases 203 of one or more servers 204 on a network 202 as the image data S31 to be identified and detects correlation with the reference image data S7 read out from the database 211.

Further, the identifier 6a of the PC 200 identifies whether the image of the camera generating the image data read from the database 203 and the reference image data S7 stored in the database 211 has been tampered with based on that correlation. When judging that it has been tampered with, it stores the address in the network 212.

As explained above, according to the above example of application, it is possible to automatically identify when part of the image data S31 to be identified is suspected of being tampered with.

According to the system 201 shown in FIG. 19, it is possible to automatically detect whether part of the image data of a homepage, bulletin board, etc. on the network 202 has been tampered with and to generate a list.

FIRST EXAMPLE OF BUSINESS APPLICATION

This example of a business application corresponds to the fifth and sixth aspects of the invention.

Figure 20:
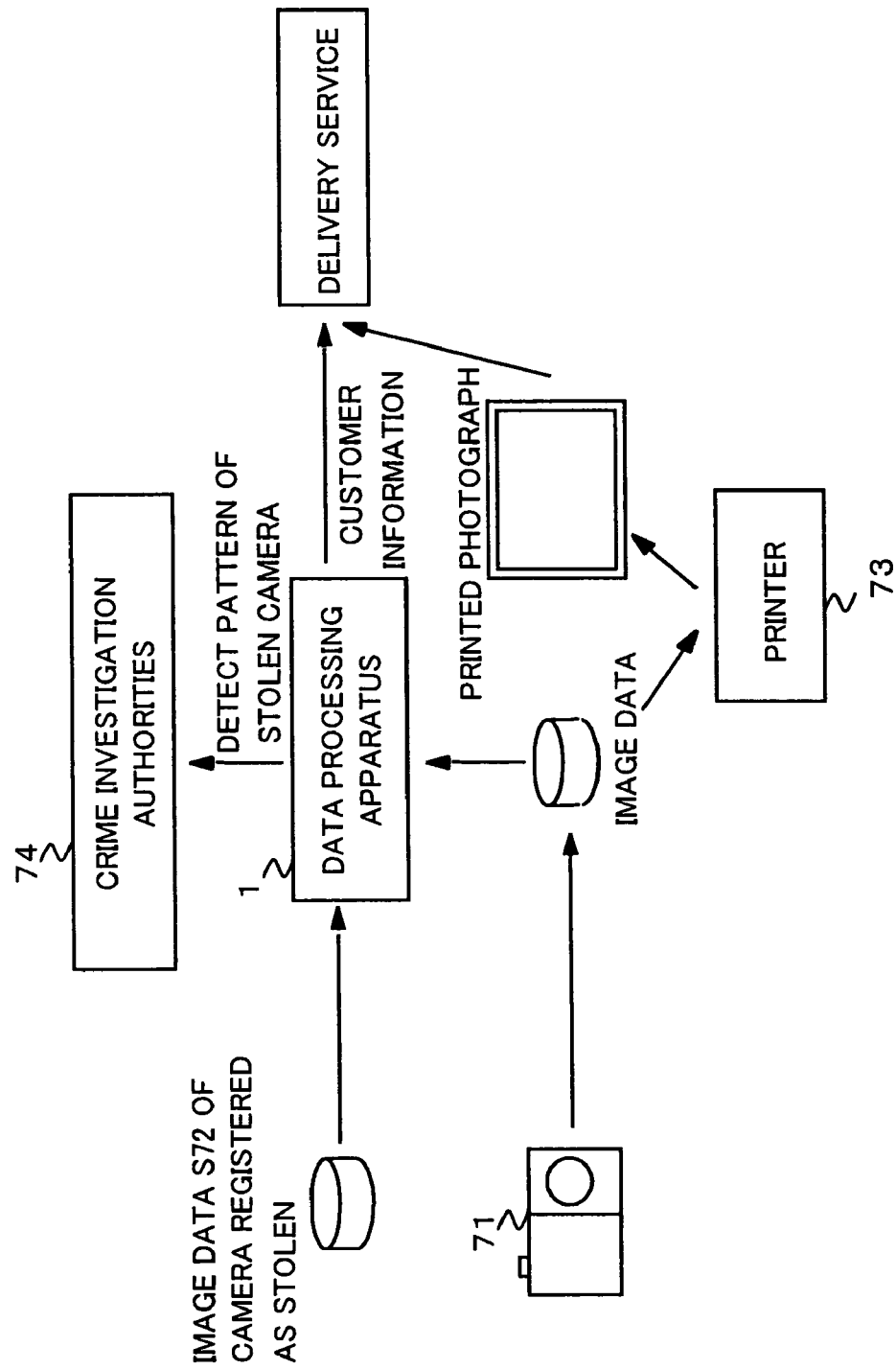
FIG. 20 is a view for explaining a first example of a business application of the data processing apparatus shown in FIG. 1.

FIG. 20 is a view for explaining the case of specifying a stolen camera at a print service.

As shown in FIG. 20, the image data S72 generated in advance by a camera registered as stolen is registered in the data processing apparatus 1.

The user of a camera 71 brings the memory card recording images to a DPE store to get the images printed by a printer 73.

At that time, the data processing apparatus 1 can identify whether image data read out from the memory card of the camera 73 was captured by a stolen camera by detecting correlation and making identification by the data processing apparatus 1 with the image of the stolen camera registered in advance.

When the result of matching of the images reveals that the correlation with the image of the stolen camera exceeds a predetermined value, this fact is notified to the criminal investigation authorities 74.

The image data S72 registered as the reference image data S7 is preferably obtained by capturing flat scenes in advance a plurality of times, but even when a camera is stolen without any preparation being taken in advance, it is also possible to register an already captured image as the reference image data S7.

SECOND EXAMPLE OF BUSINESS APPLICATION

Figure 21:
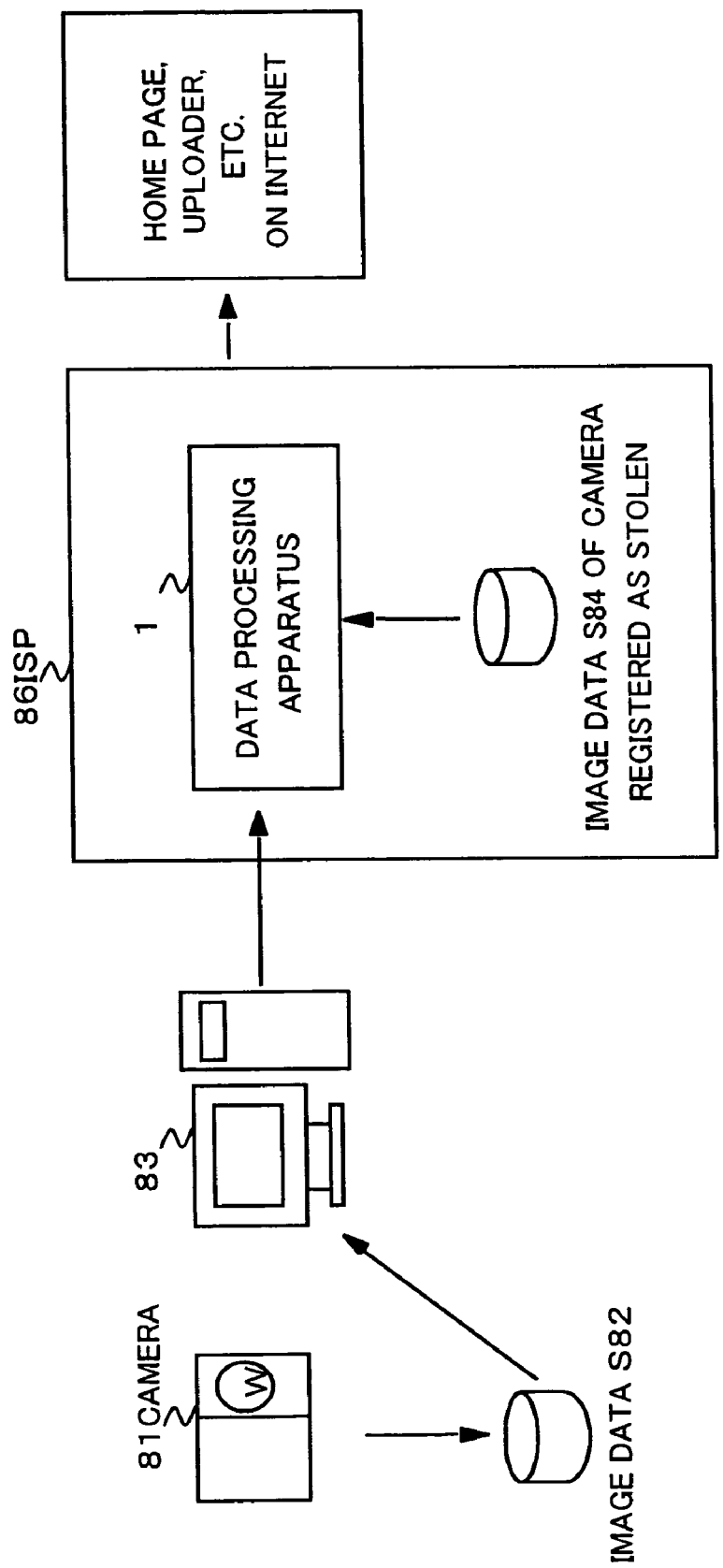
FIG. 21 is a view for explaining a second example of a business application of the data processing apparatus shown in FIG. 1.

FIG. 21 is a view for explaining the case of application of the data processing apparatus 1 to an Internet service provider (ISP) 86.

As shown in FIG. 21, a user uploads image data S82 captured by a camera 81 from a computer 83 to the ISP 86.

The ISP 86 outputs the uploaded image data S82 to the data processing apparatus 1.

Further, the data processing apparatus 1 can identify if the image data S82 input from the ISP 86 was captured by a stolen camera by detecting correlation and making identification by the data processing apparatus 1 with the image data S84 of the stolen camera registered in advance.

Further, when the ISP 86 judges that the image data S82 was not captured by a stolen camera, it uses the image data 82 as data of a homepage etc.

THIRD EXAMPLE OF BUSINESS APPLICATION

Figure 22:
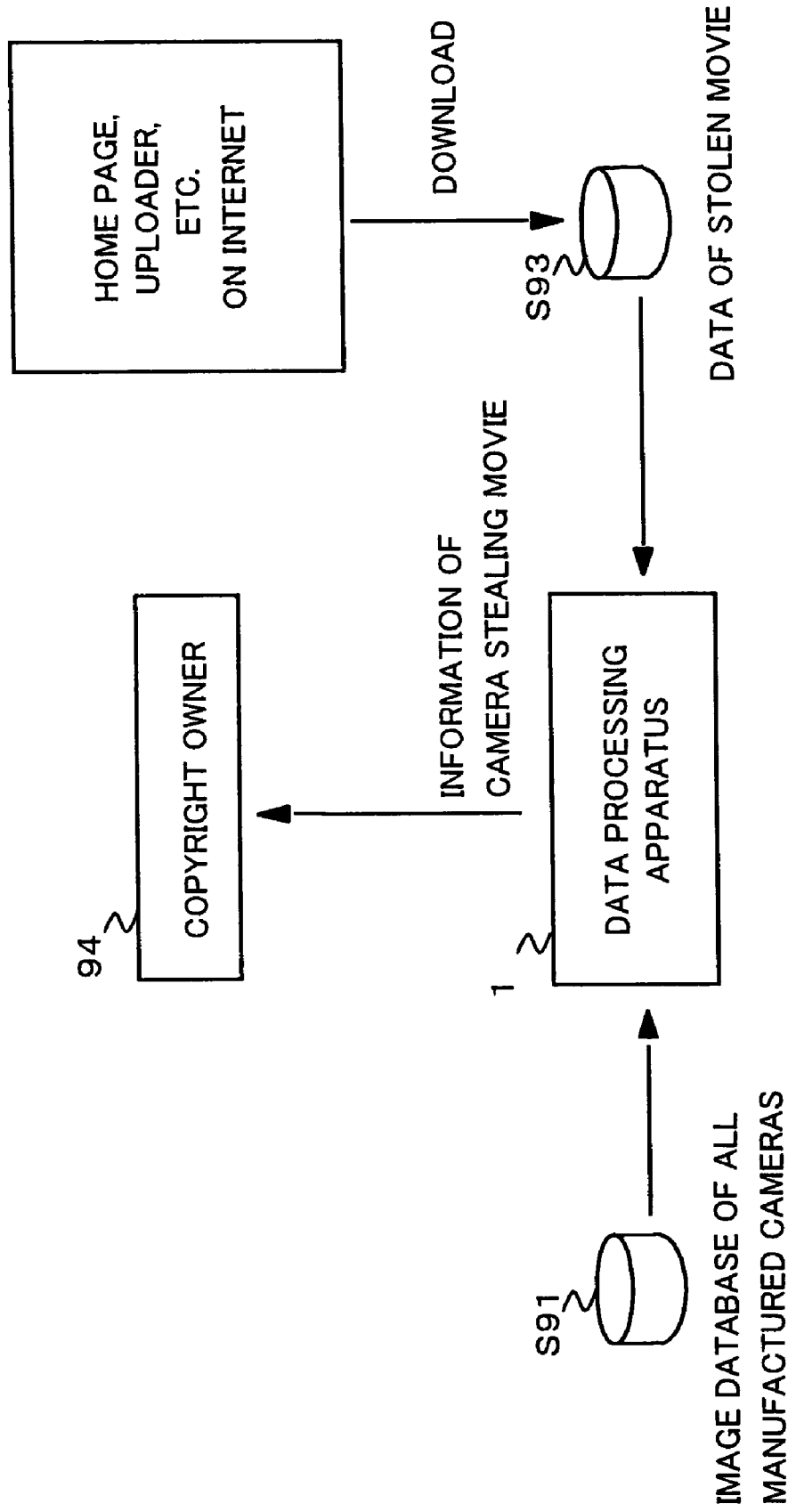
FIG. 22 is a view for explaining a third example of a business application of the data processing apparatus shown in FIG. 1.

FIG. 22 is a view for explaining the case of applying the data processing apparatus 1 for specifying the camera capturing a stolen image.

At the present time, video cameras are being brought into movie theaters to capture movies by illegal means, movies are being placed on uploaders etc. on the Internet, and files are being exchanged between users. Copyrights are being severely infringed.

Therefore, by registering reference image data S7 of all video cameras manufactured in the data processing apparatus 1 and detecting correlation with image data S93 of stolen movies in the data processing apparatus 1, it becomes possible to specify the camera stealing the movie. By notifying the camera information to the copyright owner 94, it is possible to assist identification of businesses producing pirated versions.

FOURTH EXAMPLE OF BUSINESS APPLICATION

This example of a business application corresponds to the seventh and eighth aspects of the invention.

Figure 23:
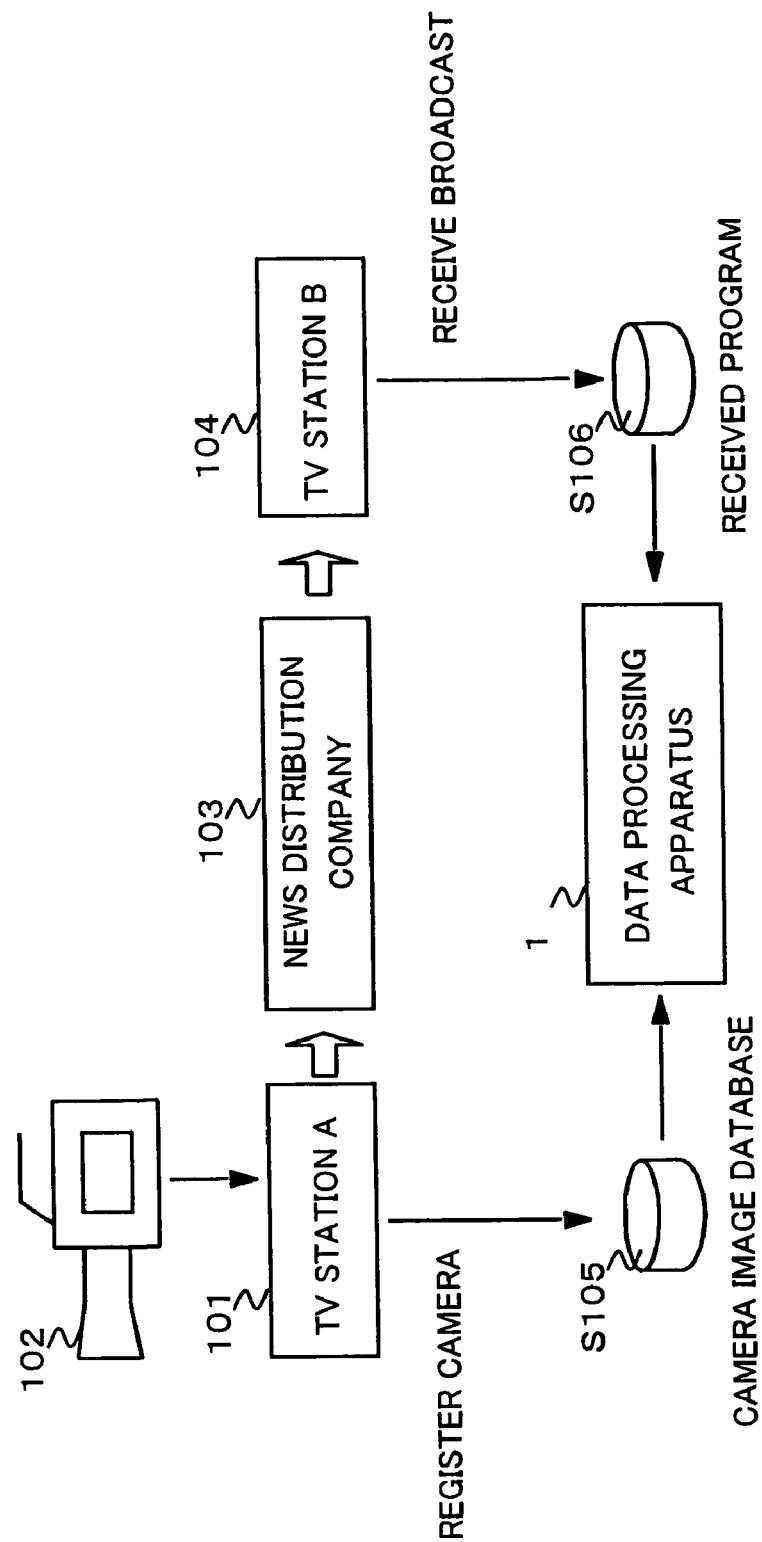
FIG. 23 is a view for explaining a fourth example of a business application of the data processing apparatus shown in FIG. 1.

FIG. 23 is a view for explaining the case of applying the data processing apparatus 1 for identifying whether a legitimately contracting company is broadcasting one=s own content.

As shown in FIG. 23, image data S105 captured by a television station A101 using a camera 102 is registered in the data processing apparatus 1 as reference image data S7.

The television station A101 provides this content data to a news distribution company 103.

Further, when the news distribution company 103 provides this content data to a television station B104, the television station A101 receives the content data broadcast by a plurality of television stations including the television station B104 and outputs this as the image data S31 to be identified as the data processing apparatus 1.

Due to this, the television station A101 can specify which television station is broadcasting its own content data based on the results of identification of the data processing apparatus 1.

Further, the television station A101 can take legal measures against a television station broadcasting its own content data when not authorizing the broadcast of its own content data.

FIFTH EXAMPLE OF BUSINESS APPLICATION

Figure 24:
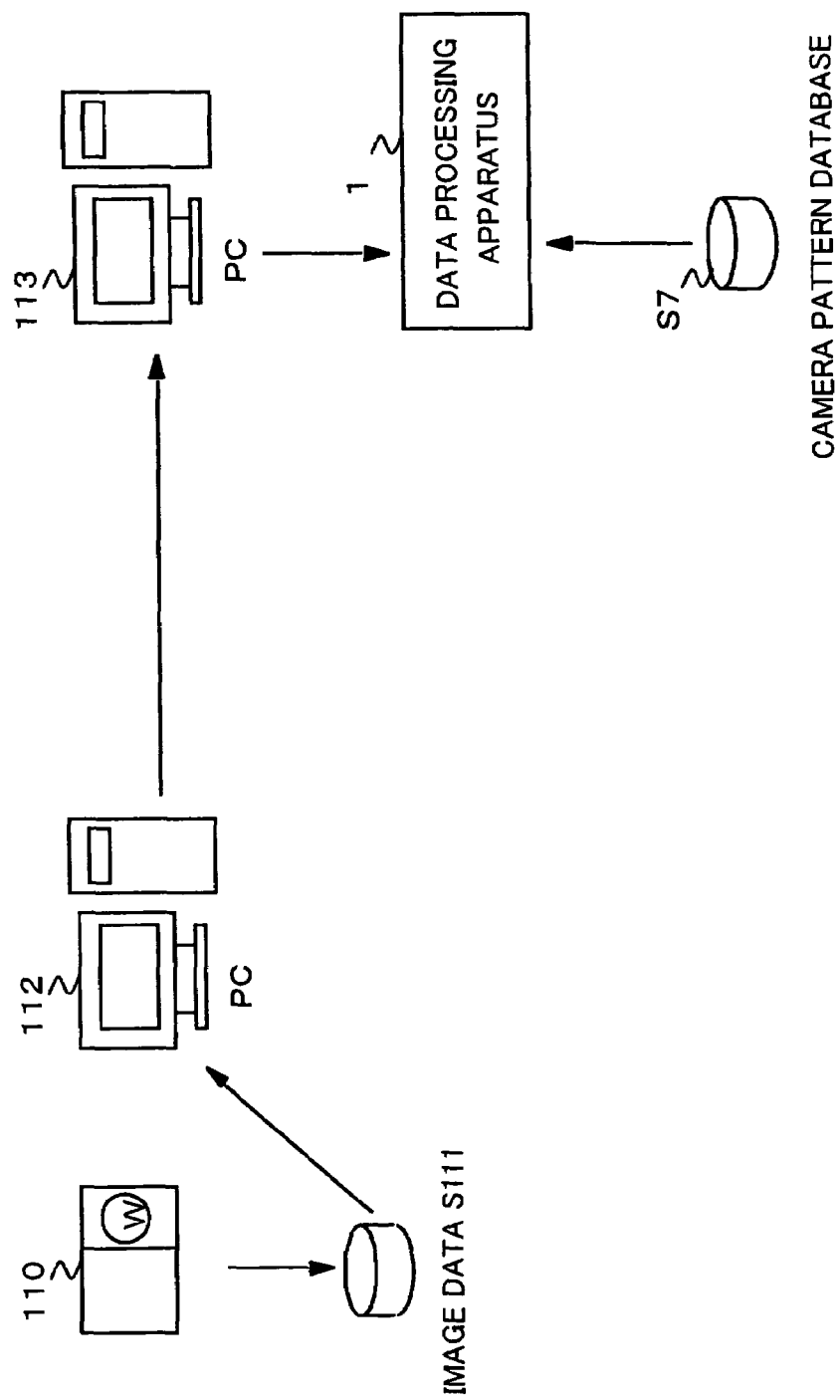
FIG. 24 is a view for explaining a fifth example of a business application of the data processing apparatus shown in FIG. 1.

FIG. 24 is a view for explaining the case of using the data processing apparatus 1 for judging legitimacy of photographic evidence of an insurance company.

The photographic evidence of an accident used by an insurance company has to be checked as to whether that photographic evidence was legitimately captured on the site of the accident.

The insurance company for example registers reference image data S7 captured in advance by a camera 110 which it registers itself in the data processing apparatus 1.

Further, at the site of the accident, the apparatus transmits the image data S111 captured at the camera 110 from a PC 112 through the network to a PC 113.

Further, the PC 113 outputs the image data received from the PC 112 to the data processing apparatus 1 as the image data S31 to be identified.

Further, the data processing apparatus 1 can identify if the image data S111 was captured by a legitimate camera 110 by performing the above processing.

SIXTH EXAMPLE OF BUSINESS APPLICATION

The data processing apparatus 1 for example can also be applied to the case of identifying whether an image has been switched midway when transmitting an image of a surveillance camera and checking it at a remote location.

In this case, image data captured by the surveillance camera in advance is registered at the data processing apparatus 1 as the reference image data S7.

Further, in the data processing apparatus 1, by using the image data received from the surveillance camera as the image data S31 to be identified and obtaining correlation with the reference image data S7, it is possible to suitably identify whether the received image data was captured by that surveillance camera.

SEVENTH EXAMPLE OF BUSINESS APPLICATION

This example of a business application corresponds to the ninth and 10th aspects of the invention.

Figure 25:
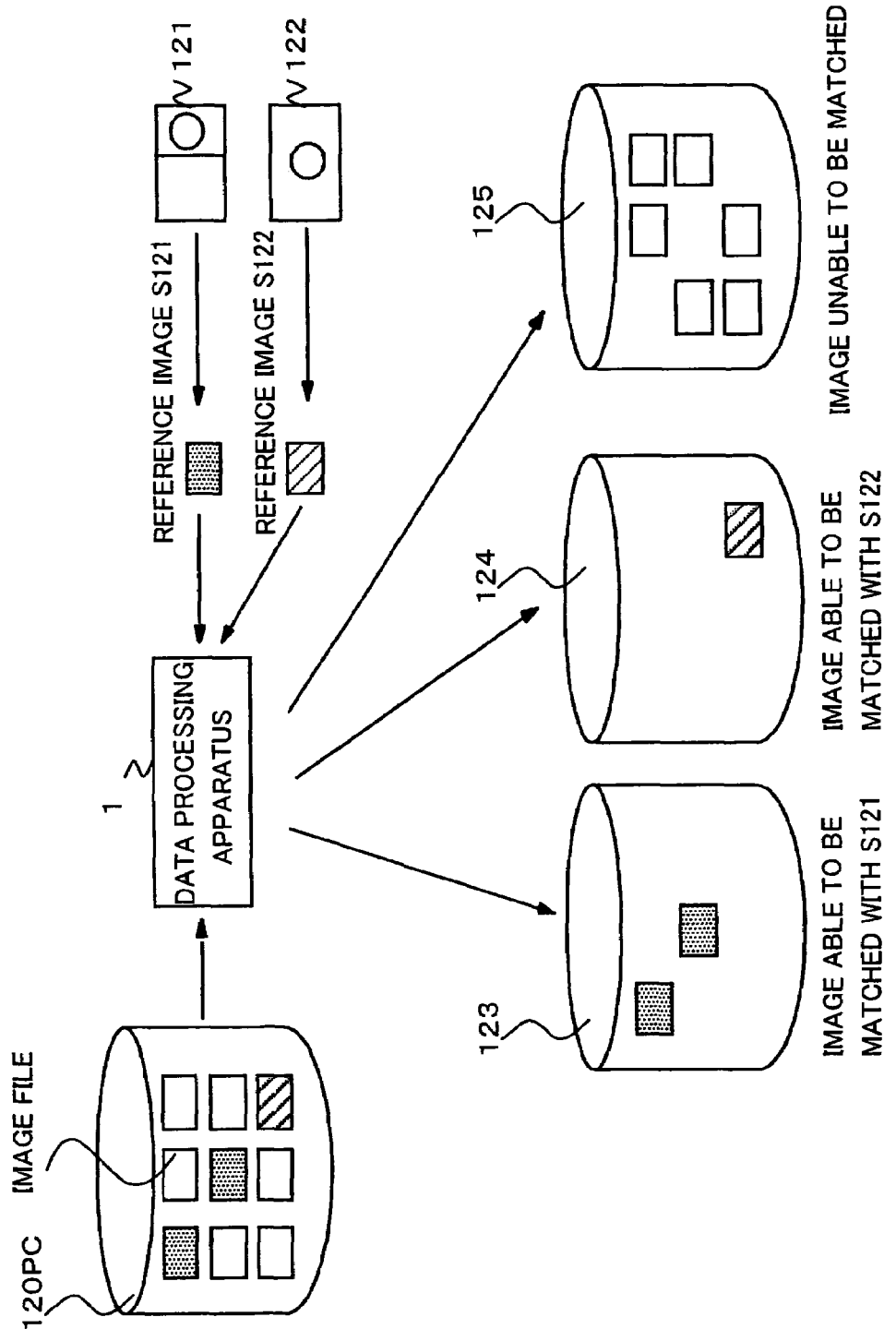
FIG. 25 is a view for explaining a seventh example of a business application of the data processing apparatus shown in FIG. 1.

FIG. 25 is a view for explaining the case of application of the data processing apparatus 1 to data management.

As shown in FIG. 25, consider the case where the memory of the PC 120 stores image files of image data captured using a plurality of cameras 121, 122, etc.

In this case, when the user searches for image files of image data captured by the cameras 121 and 122, it instructs the data processing apparatus 1 with the reference image data S7 of the cameras 121 and 122.

The data processing apparatus 1 receives as input all image files in the memory of the PC 120 as the image data S31 to be identified and discriminates (searches for) the image files of the image data captured by the cameras 121 and 122. In this case, the identifier 6 shown in FIG. 1 corresponds to the searching means of the present invention.

Further, the data processing apparatus 1 classifies the image files in the memory of the PC 120 into the group 123 of image files captured by the camera 121, the group 124 of image files captured by the camera 122, and the group 125 of image files captured by other cameras based on the results of discrimination.

EIGHTH EXAMPLE OF BUSINESS APPLICATION

Figure 26:
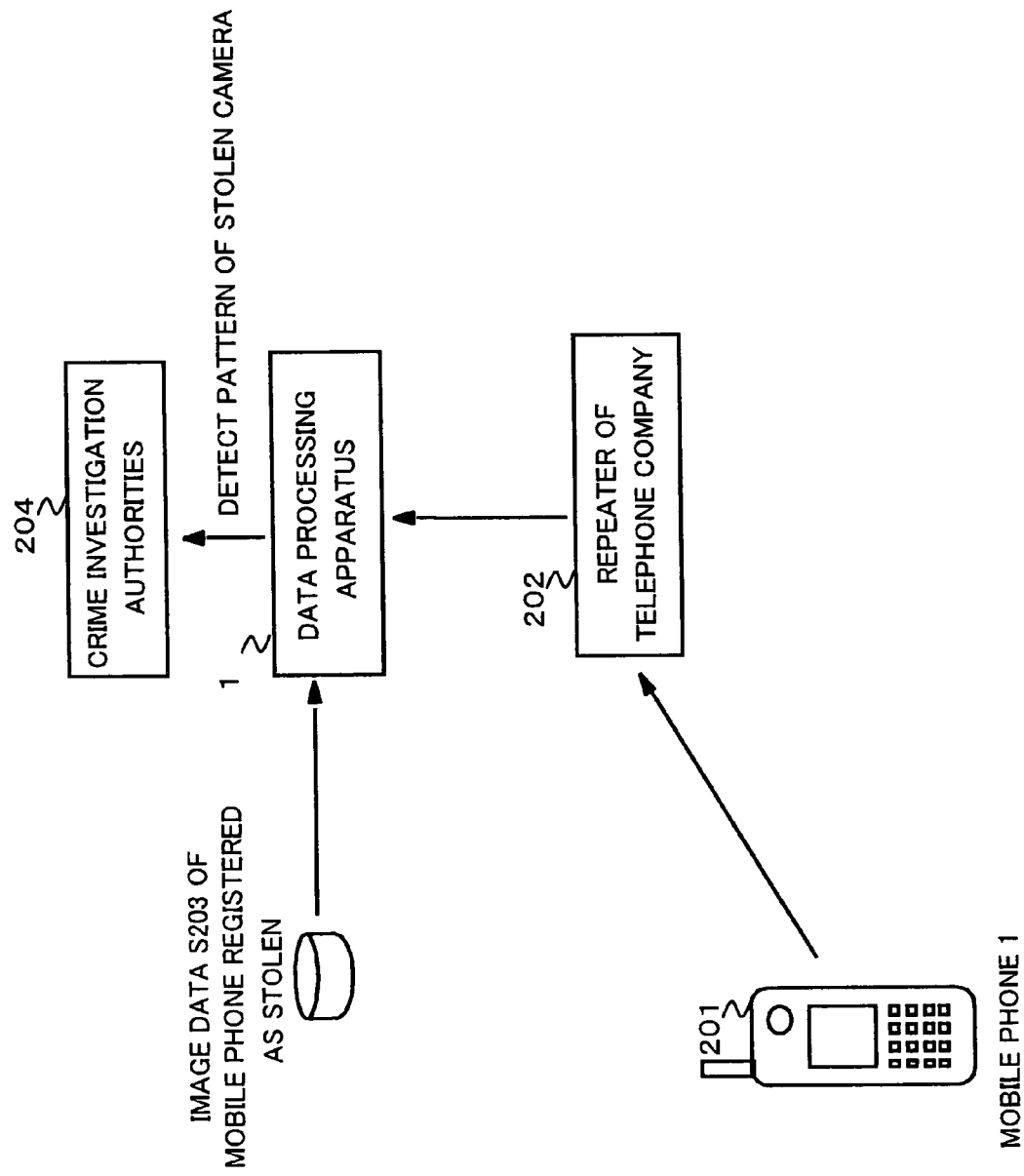
FIG. 26 is a view for explaining an eighth example of a business application of the data processing apparatus shown in FIG. 1.

FIG. 26 is a view for explaining the case of applying the data processing apparatus 1 to prevention of use of stolen mobile phones.

Even if a GSM type mobile phone 201 is stolen, it can be used if switching the SIM card. As a means for preventing theft, the identifier (IME1) given to the mobile phone 201 is frequently rewritten. By using a camera attached to the phone as an individual identifier for the mobile phone 201, it is possible to prevent such theft.

At the time of dialup when the mobile phone 201 starts a call, a single still image is sent from the mobile phone 201 to a repeater 202 of the telephone company. By using the registered image data S203 of a mobile phone as the reference image data S7 and using the still image as the image data S31 to be identified in the data processing apparatus 1, it is possible to identify whether the mobile phone 201 was stolen or not when the phone is registered as having been stolen.

Further, the data processing apparatus 1 notifies criminal investigation authorities 204 when identifying the mobile phone 201 as having been stolen.

NINTH EXAMPLE OF BUSINESS APPLICATION

Image bulletin boards on the Internet designed for carrying photographs are convenient as places for easy showing of photographs and exchange of information by photographs. Due to the spread of digital cameras, people with various tastes and preferences have begun using image bulletin boards.

These image bulletin boards, however, often cease functioning due to trouble making actions. As methods of making trouble, there are the submission of images captured off television, images scanned from magazines, and other nonphotographic images, unauthorized submission of photographs of other persons, submission of pornographic images, and continuous submission of the same images.

As methods for preventing such trouble making actions, perfect prevention is possible by confirming the identity of the party by a credit card etc., then issuing an ID and password and other means based on individual authentication, but such methods do not draw large numbers of people.

Further, the simplified ID system using cookies functions to a certain extent, if the cookies are deleted, the system becomes meaningless.

The ninth example of a business application solves the above conventional problem using the above data processing apparatus 1.

Figure 27:
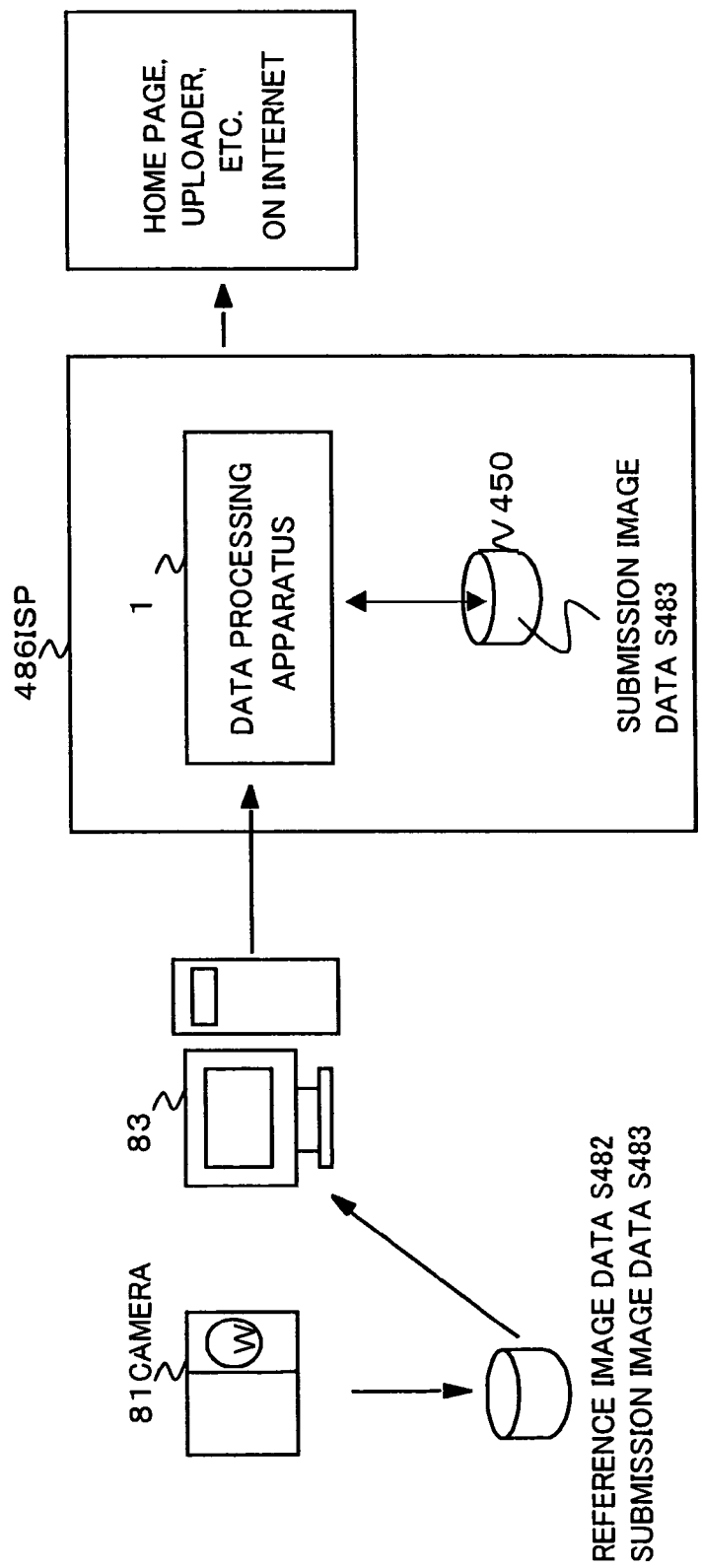
FIG. 27 is a view for explaining a ninth example of a business application of the data processing apparatus shown in FIG. 1.

FIG. 27 is a view for explaining the ninth example of a business application of the present invention.

This example of a business application corresponds to the fourth aspect of the invention.

As shown in FIG. 27, the ISP 486 has a data processing apparatus 1 and database 450 shown in FIG. 1.

The database 450 for example stores legitimate submission images identified by the data processing apparatus 1.

FIG. 28 is a view for explaining one example of a bulletin board image 451.

As shown in FIG. 28, the bulletin board image 451 displays the submission images submitted (uploaded) by a plurality of submitters to the ISP 486, the submitter names (user IDs), and comments by the submitters linked together.

A user desiring to submit an image to the bulletin board image 451 first registers itself at the ISP 486.

Figure 29:
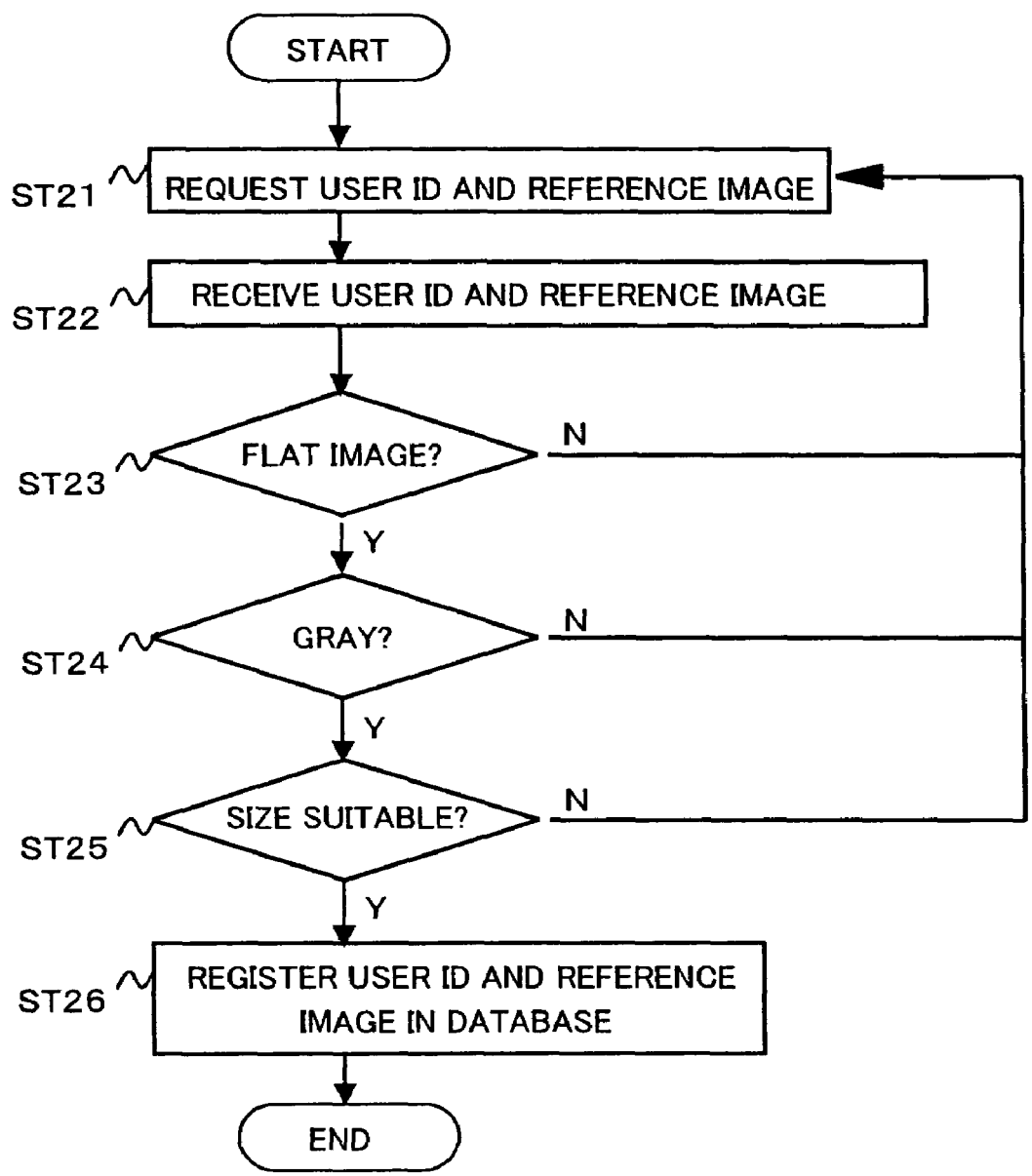
FIG. 29 is a view for explaining a ninth example of a business application of the data processing apparatus shown in FIG. 1.

FIG. 29 is a view for explaining a user registration operation performed by a data processing apparatus 1 of the ISP 486.

Step S21

A user operates the computer 83 to transmit a user registration request to the ISP 486.

The identifier 6 of the data processing apparatus 1 shown in FIG. 1 of the ISP 486 transmits a request containing the user ID and reference image to the computer 83 in accordance with the user registration request.

Step S22

The user operates the computer 83 to transmit to the ISP 486 its own determined handle or other user ID and reference image data S482 captured using its own camera 81.

The reference image data S482 is preferably data having information on all pixels of the image pickup element of the camera 81. Further, it may be data not including information other than the variation of the sensitivity of the pixels. As the ideal image, a gray and flat image not focused on the object may be mentioned. Such an image is obtained by placing the lens of the digital camera close to a sheet of white paper. Further, the reference image is preferably of a certain size or more. As an example of a lower limit of the size, a VGA may be mentioned.

The ISP 486 for example requests a reference image having such characteristics from the computer 83 at step ST21.

Step S23

The identifier 6 of the data processing apparatus 1 verifies if the reference image data S482 received at step ST22 is a flat image. If judging that it is a flat image, it proceeds to step ST24, while when not, it returns to step ST21.

Step S24

The identifier 6 of the data processing apparatus 1 verifies if the reference image data S482 received at step ST22 is a gray image. If judging that it is a gray image, it proceeds to step ST25, while if not, it returns to step ST21.

Step ST25

The identifier 6 of the data processing apparatus 1 verifies if the reference image data S482 retrieved at step ST22 has a predetermined size. If judging that it has the predetermined size, it proceeds to step ST26, while if not, it proceeds to step ST21.

Step ST26

The identifier 6 of the data processing apparatus 1 links the reference image data S482 received at step ST22 and the user ID and writes them in the memory 2 shown in FIG. 1.

Next, the operation in the case where the ISP 486 receives a submitted image will be explained.

Figure 30:
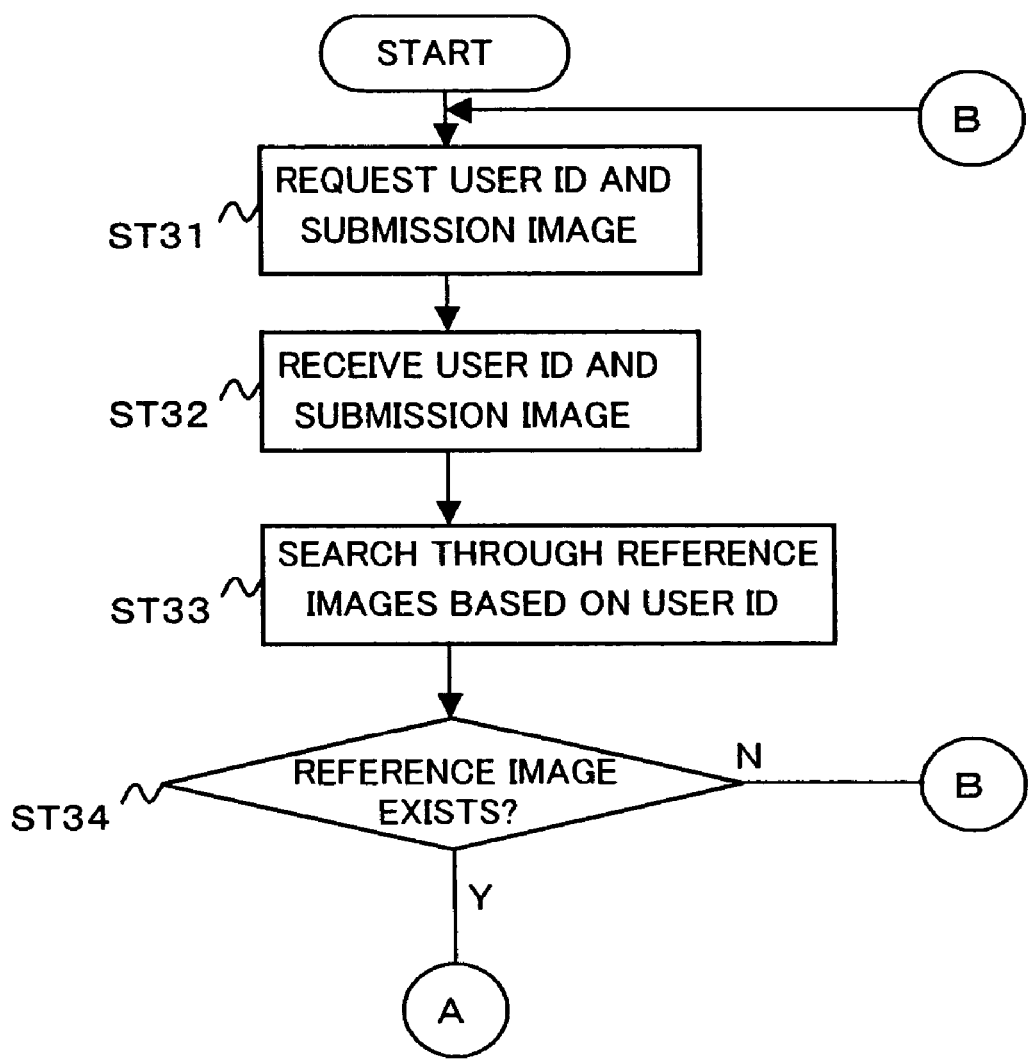
FIG. 30 is a view for explaining a ninth example of a business application of the data processing apparatus shown in FIG. 1.
Figure 31:
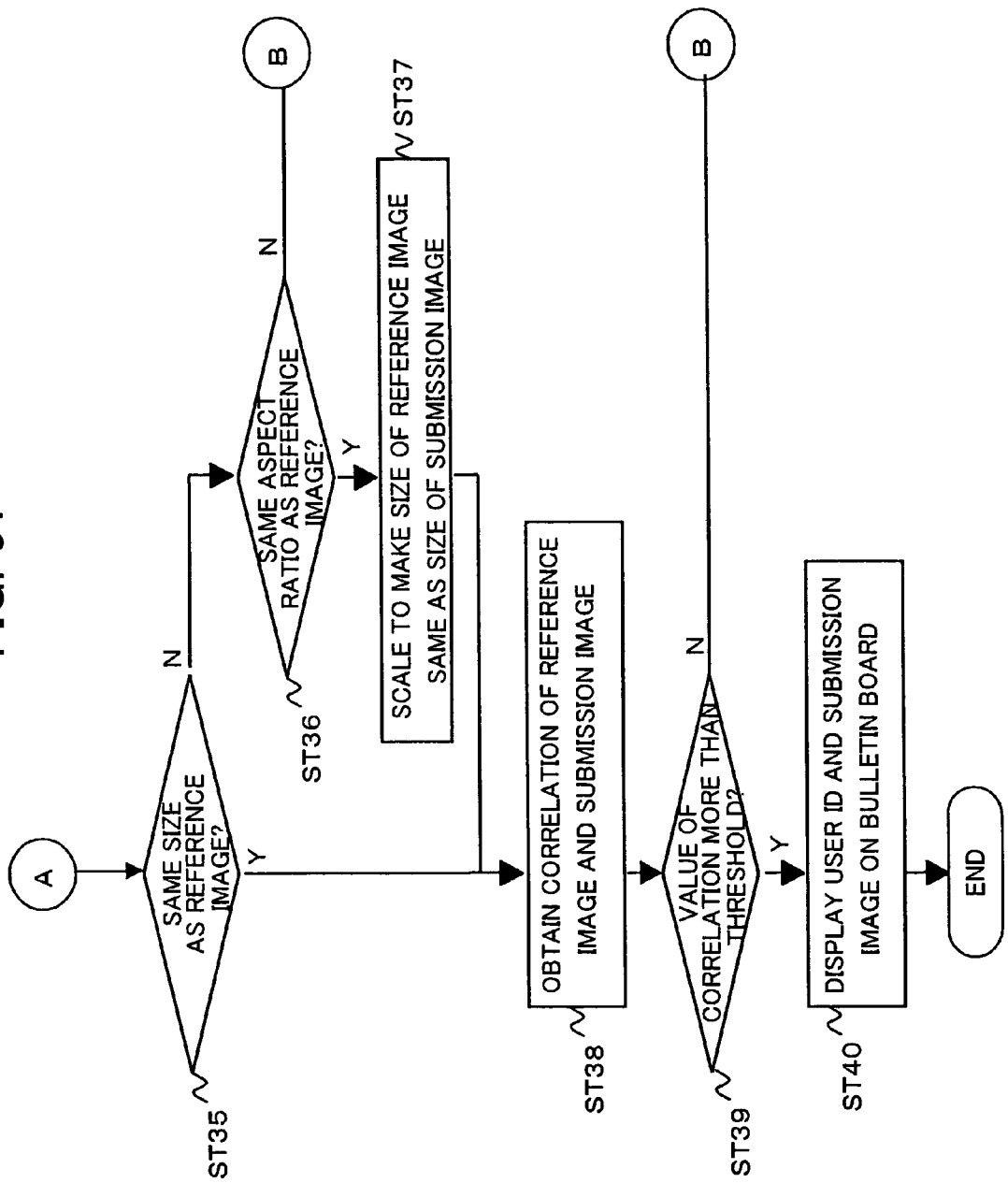
FIG. 31 is a view for explaining a ninth example of a business application of the data processing apparatus shown in FIG. 1.

FIG. 30 and FIG. 31 are views for explaining this operation.

Step S31

A user operates the computer 83 to transmit an image submission request to the ISP 486.

The identifier 6 of the data processing apparatus 1 shown in FIG. 1 of the ISP 486 requests a user ID and submitted image from the computer 83 in accordance with the image submission request.

Step S32

The user operates the computer 83 to transmit to the ISP 486 a registration request including its own determined handle or other user ID and submission image data S483 captured using its own camera 81.

Step S33

The identifier 6 of the data processing apparatus 1 searches for the reference image data S482 corresponding to that user ID from the memory 2 shown in FIG. 1 based on the user ID received at step ST32.

Step S34

The identifier 6 of the data processing apparatus 1 judges if the reference image data S482 could be retrieved at step ST33. When judging it could be retrieved, it proceeds to step ST35, while when judging it could not, proceeds to step ST31.

Step S35

The identifier 6 of the data processing apparatus 1 judges if the reference image data S482 retrieved and read at step ST33 and the submission image data S483 received at step ST32 are the same size. When judging they are the same size, it proceeds to step ST38, while when judging it could not, proceeds to step ST36.

Step S36

The identifier 6 of the data processing apparatus 1 judges if the reference image data S482 and the submission image data S483 are the same in aspect ratio. When judging they are the same in aspect ratio, it proceeds to step ST37, while when not, proceeds to step ST31.

Step S37

The identifier 6 of the data processing apparatus 1 changes the scale of the reference image data S482 to match with the scale of the submission image data S483 and uses this as the reference image data S482.

Step S38

The correlation detector 5 of the data processing apparatus 1 uses the reference image data S482 as the reference image data S7 and uses the submission image data S483 as the image data S31 to be identified to generate the correlation data S5.

Step S39

The identifier 6 of the data processing apparatus 1 judges if the correlation data S5 generated at step ST38 is more than a predetermined threshold value. When judging it is more than the predetermined threshold value, it proceeds to step ST40, while when not, it returns to step ST31.

Step S40

The identifier 6 of the data processing apparatus 1 writes the submission image data S483 received at step ST32 to the database 450 as the submission image.

Due to this, the submission image data S483 is carried on the image bulletin board plan 451 shown in FIG. 28.

According to the ninth example of business application, when uploading an image captured from television, an image obtained by scanning a magazine by a scanner, etc., since these images do not have variations in sensitivity per pixel as seen in the reference images, it is easily understood that they were not captured by the same camera as the reference images. In such a case, it is sufficient to refuse to carry it on the bulletin board.

Further, even when an image was captured by the camera capturing the reference image, when images unsuitable for the bulletin board, such as continuous submission of meaningless photographs, retaking of photographic spreads of magazines etc., or images differing from the themes of the bulletin boards, are submitted, first the user ID and the images are displayed. A person making trouble usually does not want it known who is making the trouble, so in many cases by displaying the user ID, acts of trouble are naturally reduced.

Further, if the user continues to trouble making action even if its user ID is displayed, the user is removed from the database of user registrations. If it then tries to submit an image by faking another user ID, the uploaded image will not match with the reference image registered together with that user ID, so it will not be carried on the bulletin board.

[Modification of Correlation Detector 5]

The above correlation detector 5 applies the same processing to the image data S31 to be identified and the reference image data S7 at the whitening circuits 22 and 24 shown in FIG. 3.

However, the image data S31 to be identified and the reference image data S7 are images with inherently different characteristics. Performing the same processing is not the best solution as a matching method.

Figure 32:
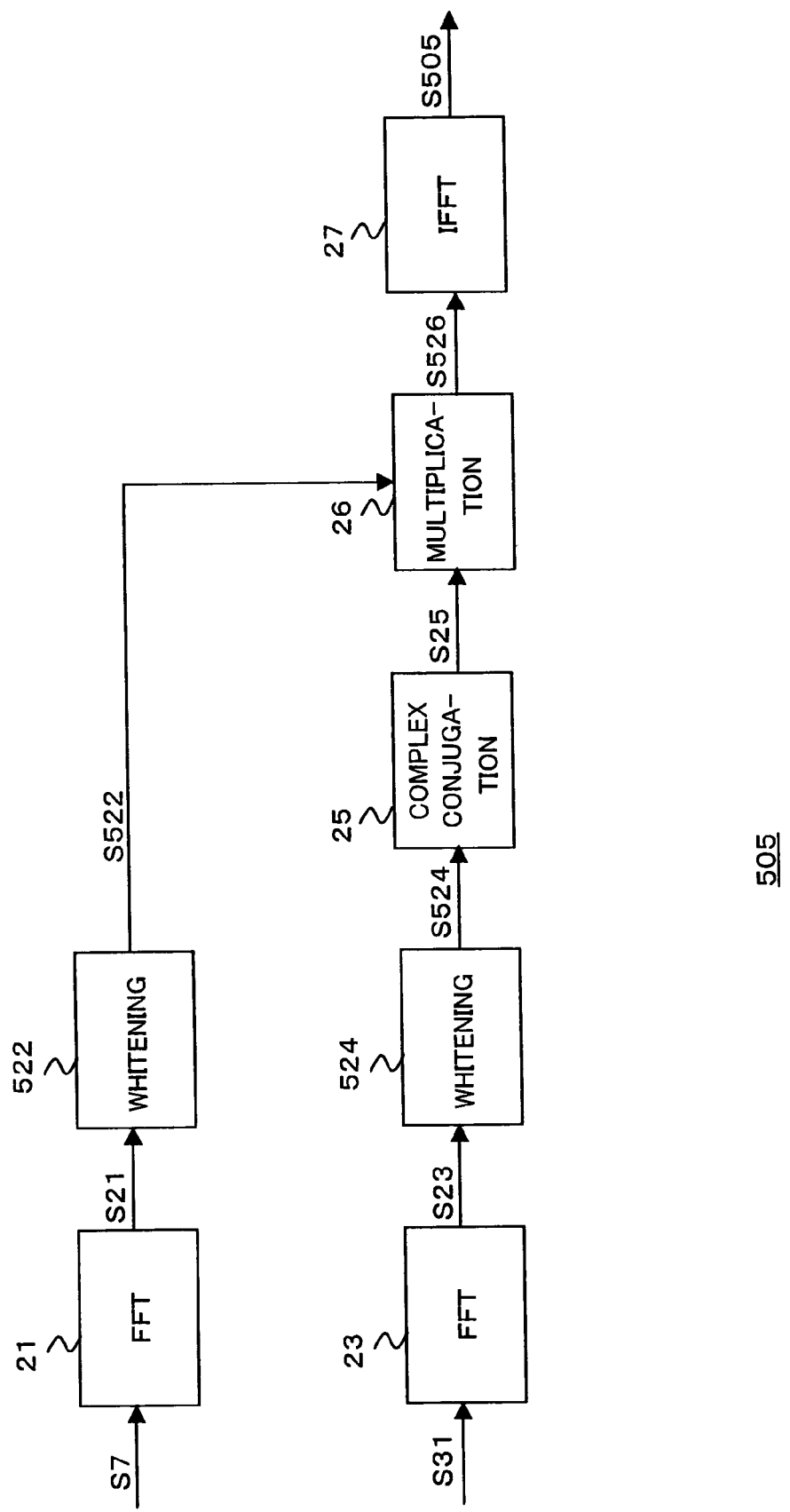
FIG. 32 is a view for explaining a modification of the correlation detector shown in FIG. 3.

FIG. 32 is a block diagram of the functions of the correlation detector 505 according to this modification.

As shown in FIG. 32, the correlation detector 505 for example has an FFT circuit 21, whitening circuit 522, FFT circuit 23, whitening circuit 524, complex conjugation circuit 25, multiplication circuit 26, and IFFT circuit 27.

This modification corresponds to the 13th aspect of the invention.

Here, the FFT circuit 21 and the FFT circuit 23 correspond to the transforming means of the present invention, the whitening circuit 522 and the whitening circuit 524 correspond to the dividing means of the present invention, the complex conjugation circuit 25 corresponds to the substituting means of the present invention, the multiplication circuit 26 corresponds to the multiplication circuit of the present invention, and the IFFT circuit 27 corresponds to the inverse transformation circuit of the present invention.

In FIG. 32, the FFT circuit 21, FFT circuit 23, complex conjugation circuit 25, multiplication circuit 26, and IFFT circuit 27 assigned the same reference numerals as in FIG. 3 are the same as those explained using FIG. 3.

The whitening circuit 522, as shown by equation (4), divides each complex number data A(i,j) forming the second frequency component data S21 input from the FFT circuit 21 by the power of k1 of the absolute value |A(i,j)| of the complex number data to generate the second complex number data Ad(i,j) (=S522).

$$Ad(i,j)=A(i,j)/(|A(i,j)|^{k1}) \quad (4)$$

The whitening circuit 524, as shown in equation (5), divides each complex number data B(i,j) forming the first frequency component data S23 input from the FFT circuit 23 by the power of k2 of the absolute value |B(i,j)| of the complex number data to generate first complex number data Bd(i,j) (=S524).

$$Bd(i,j)=B(i,j)/(|B(i,j)|^{k2}) \quad (5)$$

Here, k2>k1 and the first frequency component data S23 is given a stronger amplitude restriction compared with the second frequency component data S21.

In the present embodiment, k1 is for example 0.4 to 0.8 and k2 is for example 1.0 to 1.3.

In an experiment by the video camera A, k1=0.45 and k2=1.30 were optimal, while in an experiment by the video camera B, k1=0.6 and k2=1.0 were optimal.

The complex conjugation circuit 25 substitutes each complex number data forming the first complex number data S524 with the complex conjugate complex number data to generate third complex number data S25 and outputs it to the multiplication circuit 26.

The multiplication circuit 26 multiplies the second complex number data S522 and the third complex number data S25 to generate fourth complex number data S26 and outputs it to the IFFT circuit 27.

The IFFT circuit 27 applies an inverse Fourier transform to the fourth complex number data S26 to generate the correlation data S505 and outputs it to the identifier 6.

Here, the correlation data shows all values for which correlation is obtained by cyclically shifting the relative positions of the image data S31 to be identified and the reference image data S7 in two dimensions.

The identifier 6 identifies whether the image data S31 to be identified was generated using a predetermined camera generating the reference image data S7 based on the correlation data S505 generated by the correlation detector 505.

Figure 33:
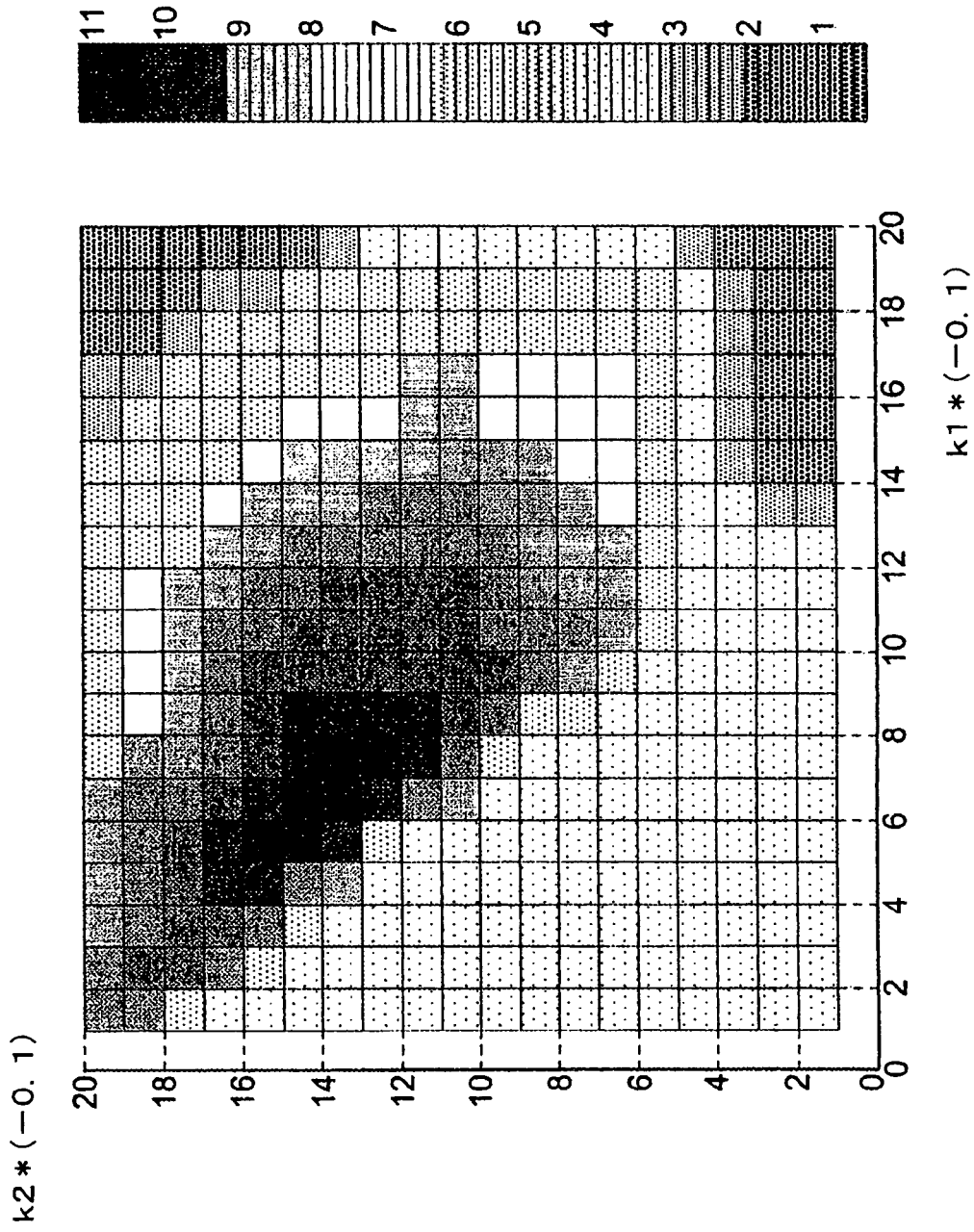
FIG. 33 is a view for explaining a modification of the correlation detector shown in FIG. 3.

FIG. 33 plots the correlation values obtained by changing k1 and k2 at the digital still camera B. By plotting values in this way, the optimal values can be found.

The whitening circuit 522 shown in FIG. 32 may also generate second complex number data S22 by further applying processing to the second frequency component data S21 defined based on the FFT coefficient for reducing to zero the FFT coefficient corresponding to a predetermined frequency band on the low band side of the predetermined frequency when the FFT circuit 21 multiplies a predetermined FFT coefficient (transform coefficient) with the reference image data S7.

Further, the whitening circuit 522 may further apply processing to the second frequency component data S21 to reduce to zero the FFT coefficient corresponding to a predetermined frequency at the high band side of the predetermined frequency and in the horizontal direction.

Figure 34:
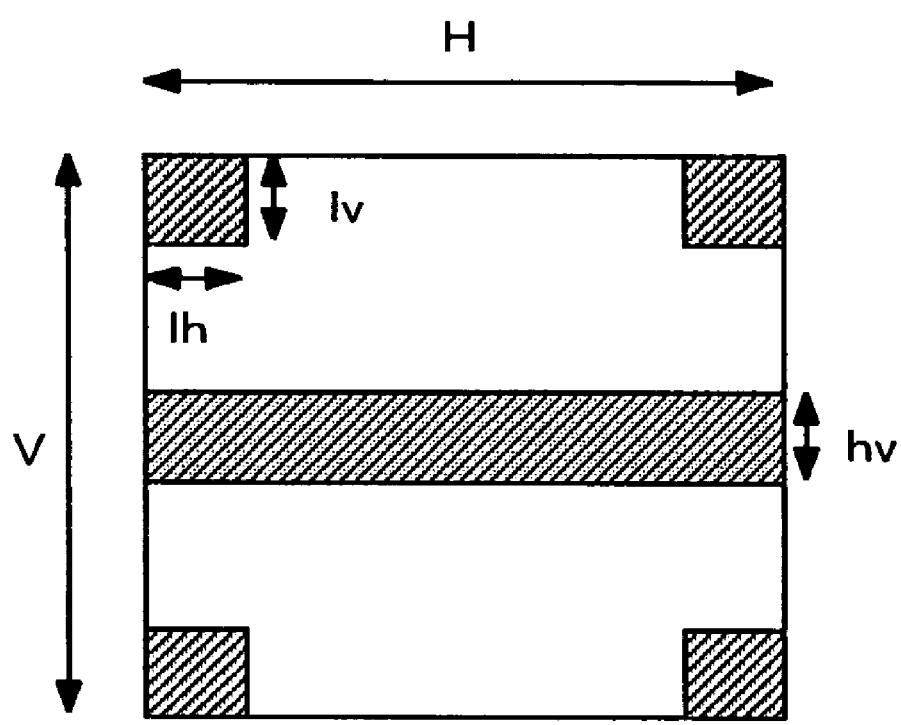
FIG. 34 is a view for explaining a modification of the correlation detector shown in FIG. 3.

Specifically, the whitening circuit 522 reduces to zero the low band signal shown by the hatching and the high band signal in the horizontal direction in the output matrix of the two-dimensional FFT shown in FIG. 34. The methods of arrangement of the two-dimensional FFT coefficients, in practice, include ones where the four corners are low in band and the center is high in band and ones where the four corners are high in band and the center is low in band. FIG. 34 shows the former case (where four corners are low in band and center is high in band).

In the FFT output matrix shown in FIG. 34, H and V show the number of FFT coefficients in the horizontal and vertical directions. The numbers of these coefficients are equal to the number of pixels of the image before two-dimensional FFT. 1 h and 1 v show the ranges for reducing to zero the low band coefficients at the four corners. hv shows the range for reducing to zero the high band coefficient in the vertical direction.

In the present embodiment, for example, it is assumed that:
"1 h=h*k1" and k1 is 0.1 to 0.15,
"1 v=v*k2" and k2 is 0.1 to 0.15, and
"hv=v*k3" and k3 is 0 to 0.2.

FIG. 35 shows the values of the correlation data S5 when matching the frames of the scenes 1 to 5 captured by the cameras 1 to 3 in frame units as images to be identified using the correlation detector 5 shown in FIG. 3 (ordinate).

FIG. 36 shows the values of the correlation data S505 when matching the frames of the scenes 1 to 5 captured by the cameras 1 to 3 in frame units as images to be identified using the correlation detector 505 shown in FIG. 32 (ordinate).

Scene 1 is an image captured under capturing conditions similar to those of the reference image.

Scene 2 is an image captured in a state holding the camera still under normal capture conditions.

Scene 3 is an image captured in a state panning the camera under normal capture conditions.

Scene 4 is an image captured in an over exposure state.

Scene 5 is an image captured in a totally dark state.

Among the above scenes 1 to 5, there is extremely high correlation for scene 1. Here, the results of matching of scene 2 and scene 3 are important in practice. Scenes 4 and 5 are not captured under normal capture conditions, so there is no problem even if matching is not possible.

As shown in FIG. 35 and FIG. 36, by using the correlation detector 505 in the data processing apparatus 1, it is possible to raise the matching precision of the camera 1 at the scene 2 compared with the case of using the correlation detector 5.

Summarizing the effects of the invention, the present invention can be applied to a data processing system for identifying a camera for obtaining image data.

While the invention has been described with reference to specific embodiments chosen for purpose of illustration, it should be apparent that numerous modifications could be made thereto by those skilled in the art without departing from the basic concept and scope of the invention.

Applicant incorporates herein by reference priority applications JP 2002-292621, JP 2003-103115 and JP 2003-296321.

The invention claimed is:

1. A data processing apparatus for identifying whether first image data was generated by a predetermined image generating apparatus, comprising:
   a light receiving unit configured to receive respective light on respective light receiving elements, the light receiving elements including an aperture, wherein different apertures vary in shape and cause distinctive variations in a light receiving sensitivity of the light receiving elements;
   a correlation detection unit configured to detect variations in a non-zero amount of light striking different light receiving elements, the different light receiving elements having distinctive variations in light receiving sensitivity due to the different aperture shapes; and
   an identifying unit configured to identify whether said first image data was generated using said image generating apparatus based on said correlation detected by said correlation detecting section,
   wherein the correlation detection unit is configured to cut out first subset image data from reference image data based on a first cutout position, to cut out second subset image data from the first image data based on a second cutout position shifted with respect to the first cutout position, and to detect a correlation between the first subset image data and the second subset image data.

2. The data processing apparatus of claim 1, wherein each of the light receiving elements include a silicon substrate, a light blocking layer provided at an aperture, a condensing lens, and an insulating layer, and the condensing lens is disposed to reach the silicon substrate through the light blocking layer from a position at an opposite side from the silicon substrate relative to the light blocking layer.

3. The data processing apparatus of claim 1, wherein the correlation detection unit includes
   a first fast Fourier transform circuit configured to apply a Fourier transform to reference image data to generate first frequency component data;
   a first whitening circuit configured to divide first complex number data forming the first frequency component data by an absolute value of each complex number data to generate first complex number data;
   a second fast Fourier transform circuit configured to apply a Fourier transform to the first image data to generate second frequency component data;
   a second whitening circuit configured to divide second complex number data forming the second frequency component data by an absolute value of each complex number data to generate second complex number data;
   a complex conjugation circuit configured to substitute each complex number data forming the second complex number data with a complex conjugate complex number data to generate third complex number data;
   a multiplication circuit configured to multiply the first complex number data and the third complex number data to generate fourth complex number data; and
   an inverse fast Fourier transform circuit configured to transform the fourth complex number data to generate correlation data, wherein the correlation data indicates all values for which a correlation is obtained by cyclically shifting the relative positions of the first image data and the reference image in two dimensions.

4. The data processing apparatus of claim 1, further comprising:
   a reference image generating unit configured to generate a plurality of reference image data and to average said plurality of reference image data to generate second image data; and
   said correlation detection unit is configured to detect a correlation between said first image data and said second image data.

5. The data processing apparatus of claim 1, further comprising:
   a reference image generating unit configured to generate a plurality of second image data by making light strike said light receiving elements in a plurality of states of different lens apertures, and
   said correlation detection unit is configured to detect a correlation between said first image data and said second image data.

6. A method for identifying whether first image data was generated by a predetermined image generating apparatus, comprising:
   receiving, at a light receiving unit, respective light on respective light receiving elements of a light receiving unit of a data processing apparatus, the light receiving unit including respective light receiving elements including an aperture, wherein different apertures vary in shape and cause distinctive variations in a light receiving sensitivity of the light receiving elements;
   detecting, with a correlation detection unit, in a non-zero amount of light striking different light receiving elements, the different light receiving elements having distinctive variations in light receiving sensitivity due to the different aperture shapes;
   identifying, with an identifying unit, whether said first image data was generated using said image generating apparatus based on said correlation detected by said correlation detecting section;
   cutting, with the correlation detection unit, out first subset image data from reference image data based on a first cutout position;
   cutting, with the correlation detection unit, out second subset image data from the first image data based on a second cutout position shifted with respect to the first cutout position; and
   detecting, with the correlation detection unit, a correlation between the first subset image data and the second subset image data.

7. The method of claim 6, wherein each of the light receiving elements include a silicon substrate, a light blocking layer provided at an aperture, a condensing lens, and an insulating layer, and the condensing lens is disposed to reach the silicon substrate through the light blocking layer from a position at an opposite side from the silicon substrate relative to the light blocking layer.

8. The method of claim 6, further comprising:

applying a fast Fourier transform to reference image data to generate first frequency component data;

dividing first complex number data forming the first frequency component data by an absolute value of each complex number data to generate first complex number data;

applying a second fast Fourier transform to the first image data to generate second frequency component data;

dividing second complex number data forming the second frequency component data by an absolute value of each complex number data to generate second complex number data;

substituting each complex number data forming the second complex number data with a complex conjugate complex number data to generate third complex number data;

multiplying the first complex number data and the third complex number data to generate fourth complex number data; and inverse fast Fourier transforming the fourth complex number data to generate correlation data, wherein the correlation data indicates all values for which a correlation is obtained by cyclically shifting the relative positions of the first image data and the reference image in two dimensions.

9. The method of claim 6, further comprising:

generating a plurality of reference image data and averaging said plurality of reference image data to generate second image data; and detecting a correlation between said first image data and said second image data.

10. The method of claim 6, further comprising:

generating a plurality of second image data by making light strike said light receiving elements in a plurality of states of different lens apertures, and detecting a correlation between said first image data and said second image data.

11. The method of claim 6, wherein the light receiving unit is a charge coupled device.

12. The method of claim 6, wherein the correlation detection unit includes a processor.

13. The data processing apparatus of claim 1, wherein the correlation detection unit includes a processor.

* * * * *